United States Patent [19]
Numata

[11] Patent Number: 5,943,669
[45] Date of Patent: Aug. 24, 1999

[54] DOCUMENT RETRIEVAL DEVICE

[75] Inventor: Kenichi Numata, Nakai, Japan

[73] Assignee: Fuji Xerox Co., Ltd., Tokyo, Japan

[21] Appl. No.: 08/975,468

[22] Filed: Nov. 21, 1997

[30] Foreign Application Priority Data

Nov. 25, 1996 [JP] Japan .................................. 8-313761
Jun. 23, 1997 [JP] Japan .................................. 9-166100

[51] Int. Cl.⁶ .................................................. G06F 17/30
[52] U.S. Cl. ...................... 707/5; 707/3; 707/4; 707/500; 707/513; 704/9
[58] Field of Search .............................. 707/4, 5, 3, 500, 707/513; 704/9

[56] References Cited

U.S. PATENT DOCUMENTS

| | | | |
|---|---|---|---|
| 5,130,924 | 7/1992 | Baker et al. .................................. | 707/5 |
| 5,325,298 | 6/1994 | Gallant ......................................... | 707/5 |
| 5,434,962 | 7/1995 | Kyojima et al. .......................... | 395/145 |
| 5,619,709 | 4/1997 | Caid et al. .................................. | 704/9 |
| 5,724,593 | 3/1998 | Hargrave, III et al. .................... | 704/7 |
| 5,794,178 | 8/1998 | Caid et al. .................................. | 704/9 |

FOREIGN PATENT DOCUMENTS 4-84271  3/1992  Japan .

OTHER PUBLICATIONS

Chung–Hsin, Lin et al., "An automatic indexing and neural network approach to concept retrieval and classification of multilingual (Chinese–English) documents", IEEE Transactions on Systems, Man and Cybernetics, Part B, Cybernectics, vol. 26, No. 1, Feb. 1996.

Cunningham, S.J. et al., "Applying machine learning to subject classification and subject description for information retrieval", Proceedings of Second New Zealand International Two–Stream Conference on Artificial Neural Networks and Expert Systems, 199, Nov. 1995.

Legakis, L., "Intelligent subject matter classification and retrieval", Canadian Conference on Electrical and Computer Engineering, 1993., vol. 1, Sep. 1993, pp. 15–18.

*Primary Examiner*—Paul R. Lintz
*Assistant Examiner*—Shahid Alam
*Attorney, Agent, or Firm*—Oliff & Berridge, PLC

[57] ABSTRACT

Parts of documents are retrieved using the entire context of selected documents. Classification unit designation section performs the designation of a classification unit. A logical structure analysis section analyzes the logical structure of the documents read-in from a document storing section where the documents are stored. A fundamental vector generation section partitions the logical structure of the documents by means of the classification unit, extracts keywords, and generates fundamental vectors. A heading vector generation section extracts key words from the headings of the structural elements that are arranged in higher level of structure than the structural element of the classification unit that was the target of fundamental vector generation, and generates heading vectors. A vector synthesis section synthesizes fundamental vectors and heading vectors, and generates composite vectors. Composite vector maintenance section attaches the corresponding composite vectors to structural elements of the classification unit that were the target of composite vector generation and maintains the attached objects. A classification section classifies the structural elements of the documents of the classification unit based on the degree of similarity of the generated composite vectors. A display section displays the results of classification.

16 Claims, 31 Drawing Sheets

FIG. 6

| VECTOR / KEYWORD | $A_{P2}$ | $W_1D$ | $W_2C$ | $W_3B$ | $V_{P2}$ |
|---|---|---|---|---|---|
| INFORMATION | | | | 0.2 | 0.2 |
| RETRIEVAL | 1.0 | | | 0.2 | 1.2 |
| TECHNOLOGY | | | | 0.2 | 0.2 |
| ADVANCEMENT | | | | 0.2 | 0.2 |
| NATURAL | | | 0.4 | | 0.4 |
| LANGUAGE | | | 0.4 | | 0.4 |
| PROCESSING | | | 0.4 | | 0.4 |
| USAGE | | | 0.4 | | 0.4 |
| DOCUMENT | | 0.6 | | | 0.6 |
| STRUCTURE | | 0.6 | | | 0.6 |
| ANALYSIS | | 0.6 | | | 0.6 |
| ROLES | 1.0 | | | | 1.0 |
| SENTENCE | 1.0 | | | | 1.0 |
| MEANING | 1.0 | | | | 1.0 |

FIG. 7

| STRUCTURAL ELEMENTS ID | COMPOSITE VECTOR |
|---|---|
| P1 | $(P_{11}, P_{12}, \cdots, P_{1t})$ |
| P2 | $(P_{21}, P_{22}, \cdots, P_{2t})$ $= (0.2, 1.2, 0.2, 0.2, 0.4, 0.4, 0.4, 0.4, 0.6, 0.6, 0.6, 1.0, 1.0, 1.0)$ |
| P3 | $(P_{31}, P_{32}, \cdots, P_{3t})$ |
| ... | ... |

FIG. 12

```
<HTML>
<HEAD>
<TITLE> National Information Infrastructure (NII) </TITLE>                        — 110
</HEAD>
<BODY>
<P> As per common knowledge, presently, in the information industrial circles of the USA. . . . </P>  — P11
. . .
<H2> 1. Market of the government </H2>
<H3> 1.1 Committee relating to NII </H3>
<P> According to the agenda relating to NII that the Clinton administration is advancing . . . . </P>  — P12
<P> As for the US government, security and . . . in this agenda . . . . </P>                          — P13
. . .
<H3> 1.2 Regulations and guidelines </H3>
<P> Regulations and laws relating to the security of computer networks . . . </P>                     — P14
. . .
<H2> 2. Plans for network security </H2>
<H3> 2.1 Computer virus counter measures </H3>
<P> As for the advancement of the computer network . . . </P>                                         — P15
. . .
<H3> 2.2 Encryption technology </H3>
<P> On April 16, 1993, the president established a new policy . . . . </P>                            — P16
. . .
<H3> 2.3 Network security supervision </H3>
<P> In the world of computer networks, open system change . . . </P>                                  — P17
<P> NIST recently produced a computer security handbook . . . . </P>                                  — P18
. . .
<H3> 2.4 Nongovernmental(private) market </H3>
<P> Security of computer systems attached to the network are . . . . </P>                             — P19
. . .
</BODY>
</HTML>
```

FIG. 14

| CLUSTER No. | TOPIC | THE NUMBER OF PARAGRAPHS |
|---|---|---|
| 1 | NII | 70 |
| 2 | SECURITY | 73 |
| 3 | INFORMATION DISCLOSURE | 8 |
| 4 | ENCRYPTION TECHNOLOGY | 164 |
| 5 | TECHNICAL BACKGROUND OF INTERNET | 105 |
| 6 | INTERNET CONNECTION SERVICE | 87 |
| 7 | FLAT PANEL DISPLAY | 63 |
| 8 | HPCC PLAN | 138 |
| 9 | NFS net | 24 |
| 10 | EDUCATION | 94 |
| 11 | EDI | 98 |
| 12 | ELECTRONIC COMMERCE | 95 |
| 13 | VIDEO ON DEMAND | 55 |
| 14 | MULTIMEDIA | 31 |

| CLUSTER No. | TOPIC | THE NUMBER OF PARAGRAPHS |
|---|---|---|
| 15 | PERSONAL COMPUTER | 34 |
| 16 | INDUSTRY ADVANCEMENTS | 68 |
| 17 | MPU | 20 |
| 18 | MICROSOFT | 130 |
| 19 | BBS | 48 |
| 20 | LAW | 27 |
| 21 | INTRANET | 98 |
| 22 | INTERNET TELEPHONE | 17 |
| 23 | INTERNET BUSINESS | 33 |
| 24 | CALS | 33 |
| 25 | MODEM | 20 |
| 26 | APPLE | 10 |
| 27 | NC | 9 |
| 28 | UNCLASSIFIABLE | 5 |

FIG. 19

```
                                                      120
┌─────────────────────────────────────────────────────┐
│     TECHNOLOGICAL ADVANCEMENT IN INFORMATION RETRIEVAL │
│                                                       │
│  1. BACKGROUND                                        │
│                                                       │
│     P21  (INTERNET, INFORMATION, ACCESS)              │
│     P22  (MULTIMEDIA, TEXT, RETRIEVAL)                │
│                                                       │
│  2. VECTOR SPACE MODEL                                │
│                                                       │
│     P23  (SECTION, VERIFICATION, RETRIEVAL)           │
│     P24  (WORD, EMPHASIS, VECTOR)                     │
│     P25  (FREQUENCY, DISPERSION, SIMILARITY)          │
│                                                       │
│  3. USAGE OF NATURAL LANGUAGE PROCESSING              │
│                                                       │
│   3.1. THESAURUS                                      │
│     P26  (VOCABULARY, DICTIONARY, RETRIEVAL)          │
│                                                       │
│   3.2. DOCUMENT STRUCTURE ANALYSIS                    │
│     P27  (CONTEXT, TEXT, CONCEPT, RETRIEVAL)          │
│     P28  (SENTENCE, MEANING, ROLE, RETRIEVAL)         │
│     P29  (RETRIEVAL, ACCURACY, STATISTICS, INFORMATION)│
│                                                       │
│  4. USER INTERFACE                                    │
│                                                       │
│     P30  (USER, INTERACTION, BROWSING)                │
└─────────────────────────────────────────────────────┘
```

FIG. 20

|  | P21 | P22 | P23 | P24 | P25 | P26 | P27 | P28 | P29 | P30 |
|---|---|---|---|---|---|---|---|---|---|---|
| NATURAL | 1.2 |  |  |  |  | 0.4 | 0.4 | 0.4 | 0.4 |  |
| LANGUAGE |  | 1.2 |  |  |  |  | 0.4 | 0.4 | 0.4 |  |
| PROCESSING |  |  | 1.2 |  |  | 0.4 | 0.4 | 0.4 | 0.4 |  |
| USAGE |  |  |  | 0.2 | 0.2 | 0.2 | 0.2 | 0.2 | 0.4 |  |
| INFORMATION | 0.2 | 0.2 | 0.2 | 0.2 | 0.2 | 1.2 | 1.2 | 1.2 | 1.2 | 0.2 |
| RETRIEVAL |  |  |  |  |  |  |  |  | 1.2 | 0.2 |
| TOTAL | 1.4 | 1.4 | 1.4 | 0.4 | 0.4 | 2.6 | 2.6 | 2.6 | 3.6 | 0.4 |

TECHNOLOGICAL ADVANCEMENTS
IN INFORMATION RETRIEVAL

1. INTRODUCTION

. . .

2. XXX

. . .

3. USAGE OF NATURAL LANGUAGE PROCESSING 3.1. YYY

. . .

3.2. DOCUMENT-STRUCTURE ANALYSIS

| P1 |
|---|

| P2   (SENTENCE, MEANING, ROLE, RETRIEVAL) |
|---|

| P3 |
|---|

4. ZZZ

. . .

DOCUMENT RETRIEVAL DEVICE

BACKGROUND OF THE INVENTION

1. Field of Invention

The present invention relates to a document retrieval device and more particularly to a document retrieval device that retrieves documents that have a tree structure, such as those where certain structural elements include other structural elements, and classifies and displays them for each structural element.

2. Description of Related Art

Generally, methods that extract key words from the content of a document use a broad interpretation of the key words in order to retrieve documents, or portions of a document, having the characteristics of the key words. The key words are extracted from the document by comparing the document content to the word lists prepared beforehand, using morphological analysis, and the like.

Some systems extract key words from documents and automatically perform the retrieval of documents. Using a technique referred to as the vector space model, the document and the query of the document retrieval (hereinafter query) are expressed by means of the vectors where the weight of a key word is expressed as an element. Then, the degree of similarity of the document vectors and the query vector are calculated, and documents are output as the results of the document retrieval ordered by the degree of similarity. Documents having a high degree of similarity of vectors are pre-classified in sets, or categories, with consideration being given to more efficient document retrieval.

Additionally, if the key word is used in the document, a positive value is set, and if it is not used, 0 is set in the weight corresponding to the key words. Also, Term Frequency (TF) in the document of corresponding key words and Inverse Document Frequency (IDF) within the categories are used in setting the weight.

The degree of similarity between the query and the document, the degree of similarity among the documents, the degree of similarity between the documents and categories, and the like can be calculated by this document automatic retrieving system using the extracted key words. There are various methods of calculation of the degrees of similarity, such as the simple method where the similarity is determined by the number of common key words, and the method that performs calculations of the degree of similarity of the vectors that provide emphasis based on the frequency of appearance and the dispersion of the key words. Furthermore, in the methods that calculate the degrees of similarity of the vectors, the inner products of the vectors and the cosine coefficients are often used. Most of the automatic document retrieval system retrieve documents as whole units.

However, in the case that the units of retrieval are documents as a whole, the retriever can get the entire documents as retrieval results, and the retriever cannot locate the necessary sections if he does not look over the entire body of the document, regardless of the document size. Conversely, when multiple topics are present in the documents, even if queries are performed relating to the topics that are included in the documents, the documents can not be retrieved because the degree of similarity between the whole body of the document and the queries is low.

Concerning these problems, an example is provided hereafter with an explanation. FIG. 29 illustrates an example of the result of automatic document retrieval. The four documents, 301, 302, 303, 304 and the key word set that was extracted from the respective content are shown together. However, in order to simplify the explanation, the number of key words that appears in each document is made to be smaller than that in the actual documents.

The four documents 301, 302, 303, 304 can be classified into two categories, 310 and 320, based on the degree of joint-ownership of the key words. Category 310 can be assumed to contain documents describing systems for the visualization of the information space from the common key words of document 301 and document 302, including "information", "space", "visualization", "structure", "architecture", and "experiment". Similarly, category 320 can be assumed to contain documents describing systems that classify documents based on the degree of similarity from the common key words of document 303 and document 304, including "document", "similarity", "vector", "classification", "experiment", "evaluation", and "precision".

FIG. 30 illustrates each document shown in FIG. 29 with their respective paragraph structure. Each document is separated into multiple paragraphs, and key words are extracted from each paragraph. Furthermore, the key word set corresponding to each document illustrated in FIG. 29 is the logical sum of the key word set of all the paragraphs of each document.

If the user has an interest relative to "document retrieval", the parts that are thought to be related to "document retrieval" within the documents illustrated in FIG. 30 comprise the second paragraph of document 302 and the second paragraph of document 303.

However, document 302 and document 303 are classified into different categories 310 and 320, respectively, in FIG. 29. Moreover, the subject of category 310 comprises "information space visualization" and the subject of category 320 comprises "classification of documents", and there is no relevancy for either of them in terms of "document retrieval". As a result, when the documents that are mentioned relative to "document retrieval" are classified into categories 310 and 320, it is difficult for the user to conjecture that the related documents are classified into the categories.

Thus, in the situation where the units of retrieval are the documents, even if multiple topics are revealed in the documents, this information gets buried in the main subjects of the bodies of the documents. As a result, even if topics which certainly have relevancy are contained in the documents, the problem occurs where they cannot be retrieved.

When the documents are partitioned into logical structure elements, for example, chapters, sections, paragraphs, and the like, a method that resolves the above problems with a document automatic retrieval system is the method that retrieves the partitioned structural elements as units.

For example, chapter headings and paragraphs are retrieved from the document, and the degree of similarity between the query and chapter headings, as well as the degree of similarity between the query and paragraphs, are calculated respectively. The two degrees of similarity are added, and this is made to be a degree of similarity between the query and the whole body of the chapter. This method is disclosed in Japanese laid-open patent 4-84271 publication "document content retrieval device", that outputs as retrieval results the chapter units in the order commencing from the high degrees of similarity. Using this method, chapters, where the words relating to the query are included in both of the chapter heading and the paragraphs, can be retrieved and placed in higher order than chapters that only include the words in one side.

However, by this method, the documents are assumed to have only chapters and paragraphs, and no consideration is given concerning documents having more detailed structure. Also, each chapter is treated as independent information, and no consideration is given concerning the positions that the content of these chapters occupy in the document, or, in other words, their context.

FIG. 31 is an example of documents having logical structural elements comprising titles, chapters, sections, paragraphs and the like.

In FIG. 31, paragraph P2 holds the context, that is, for example, in the section relative to "document structure analysis" in the chapters relative to "usage of natural language processing" in the documents having a title "technological advancements in information retrieval".

However, in the case where this paragraph is retrieved by the above methods, the target of calculation of similarity are only key words, "sentence, meaning, role, retrieval", that were extracted from Paragraph P2, as well as the key words "document, structure, analysis", that were extracted from the headings of Chapter 3 Section 2, and the above context is not considered at all. Therefore, Paragraph P2 is not assumed to mention the technology that uses the natural language processing, and as a result, it can not be retrieved by the query relative to natural language processing.

Additionally, if classification to the categories is performed by means of the structural elements units without considering the context, a similar problem occurs. In FIG. 31, if the paragraphs are classified based on the content of Paragraph P2, Paragraph P2 is not classified as being "the paragraph relating to the document structure analysis in the natural language processing".

Thus, the structural elements of the document are treated as only having the information included just by this means.

The present invention has the objective of providing a document retrieval device wherein retrieval is made possible of the structural element units by taking into consideration the context of the entire body of a document.

SUMMARY OF THE INVENTION

This invention provides a device which overcomes the limitations of retrieving documents based on the entire document content without taking into account the structural elements of the document, as discussed above.

The invention further provides a device that allows a document to be sorted by its classification units, for example, chapters, sections and paragraphs. The document is analyzed for its logical structure, the structural elements of the classification units are determined, and a hierarchical relationship is developed of the structural elements. Headings are identified for each structural element. Fundamental vectors are generated based on key words for each classification unit. Heading vectors are generated based on the key words extracted from each heading. Fundamental vectors and corresponding heading vectors are used to synthesize composite vectors, and the corresponding structural elements are attached to the composite vector. The composite vectors are used to determine degree of similarity, and the documents are classified based on the degree of similarity among the composite vectors, and reclassified if necessary. Documents may be retrieved based on their degree of similarity to the query, indicative of the quality of the document search.

Other aspects of the invention will become apparent from the following more detailed description, taken in conjunction with the accompanying drawings.

BRIEF DESCRIPTION OF THE DRAWINGS

FIG. 6 is a table illustrating the generation of composite vectors relative to paragraph P2 of a document illustrated in FIG. 4.

FIG. 7 illustrates the composite vectors generated from the document in FIG. 4 corresponding to classification units "paragraphs".

FIG. 12 illustrates an example of an HTML document that is stored in document storing section illustrated in FIG. 1.

FIG. 14 is a classification table illustrating the results of manual classification of the documents in the experimental sets.

FIG. 19 illustrates an example of a document that is stored in the document storing section.

FIG. 20 is a table illustrating the comparison of the query vector and composite vectors of each paragraph of a document illustrated in FIG. 19.

FIG. 31 illustrates an example of a document that has logical structural elements of titles, chapters, sections, paragraphs, and the like.

DETAILED DESCRIPTION OF PREFERRED EMBODIMENTS

Figure 1:
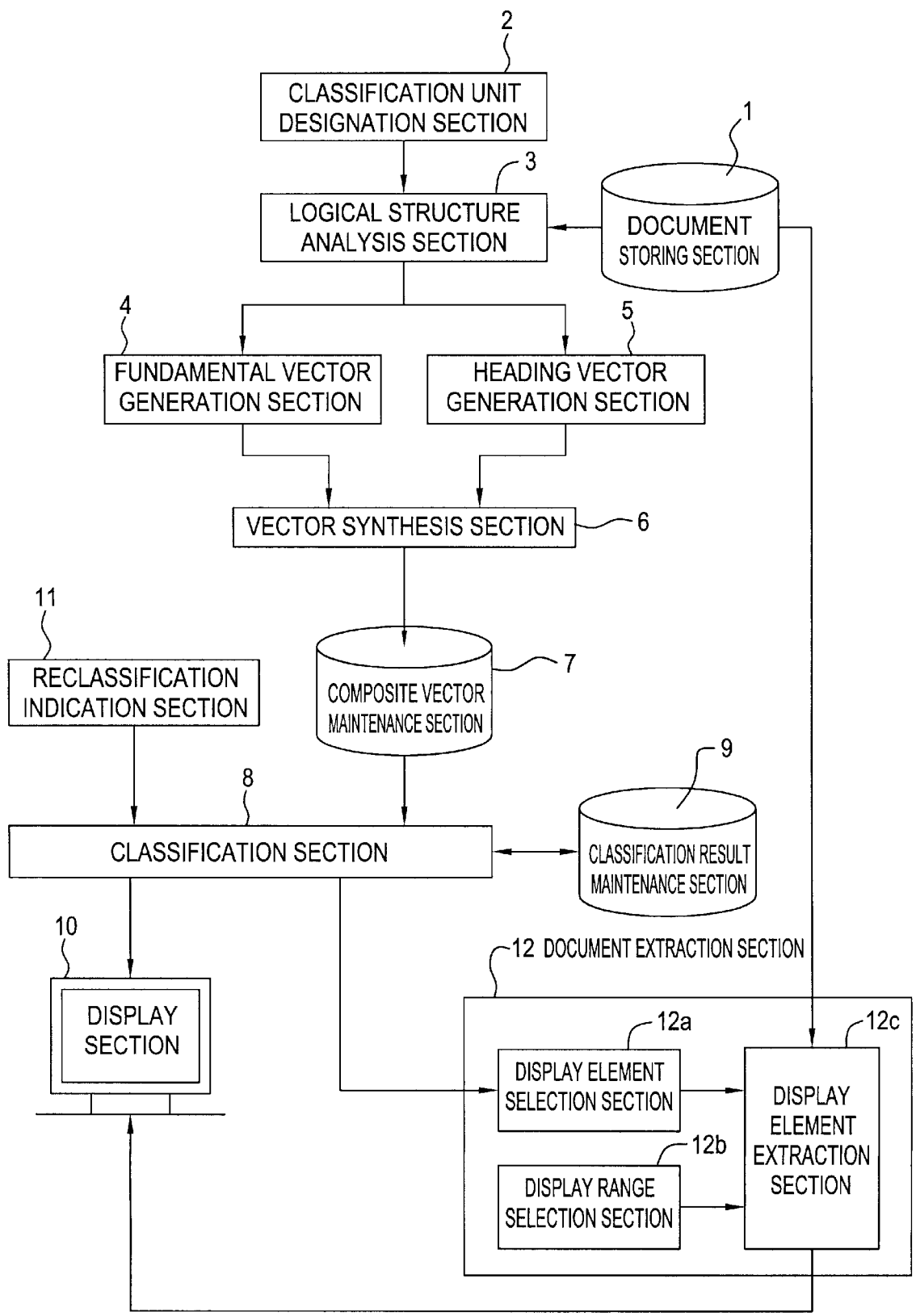
FIG. 1 illustrates the fundamental structure of the first embodiment of a document retrieval device of the present invention.

FIG. 1 illustrates the fundamental structure of the first embodiment of the document retrieval device of the present invention.

The document retrieval device comprises a document storing section 1, a classification unit designation section 2, a logical structure analysis section 3, a fundamental vector generation section 4, a heading vector generation section 5, a vector synthesis section 6, a composite vector maintenance section 7, a classification section 8, a classification results maintenance section 9, a display section 10, a reclassification indication section 11, and a document extraction section 12. The document extraction section 12 includes a display element selection section 12a, a display range selection section 12b, and a display element extraction section 12c.

The document storing section 1 stores the documents which are to be retrieved. In the document storing section 1, documents which have logical tree structure, where certain structural elements include other structural elements, are stored. Classification unit designation section 2 performs the designation of the classification units as "documents", "chapters", "sections", "paragraphs", and the like. Logical structure analysis section 3 reads the documents from document storing section 1, and analyzes the logical structure of the read documents. A hierarchical relationship is developed of the structural elements of the document by analysis of the logical structure. Fundamental vector generation section 4 partitions the logical structure of the documents that were analyzed in logical structure analysis section 3 by means of the classification units that were designated by the classification unit designation section 2, the key words are extracted from each classification unit, and the fundamental vectors are generated based on the extracted key words.

The heading vector generation section 5 extracts key words from the headings of all of the structural elements that are arranged in higher level than the structural elements of the classification units, and heading vectors are generated based on these key words. Details of how to generate heading vectors will be explained later with an example.

Vector synthesis section 6 synthesizes the fundamental vectors that are generated with fundamental vector generation section 4, and the heading vectors that are generated with heading vector generation section 5, and generates the composite vectors. Composite vector maintenance section 7 attaches the structural elements of the classification units from which the fundamental vectors were generated with fundamental vector generation section 4, to the composite vectors that were generated with vector synthesis section 5, and maintains the attached objects.

Classification section 8 classifies the documents into one or more categories based on the degree of similarity among the composite vectors that were maintained at composite vector maintenance section 7. This classification is performed for each unit that was designated by the classification unit designation section 2. Classification result maintenance section 9 maintains the results of the classification that was performed by classification section 8. Display section 10 displays the categories resulted from the classification that was performed with classification section 8, and the documents that were partitioned into the classification units that are included in each category. Reclassification indication section 11 selects the categories which are to be reclassified from the classification results that were performed with classification section 8 and indicates reclassification.

Document extraction section 12 selects an element from the categories that were classified with classification section 8, and displays it on display section 10. In other words, an element is selected by display element selection section 12a from categories which are displayed in display section 10. Display range selection section 12b selects the range to be displayed from documents. Display element extraction section 12c extracts an element that was selected by the display range selection section 12b from the document storing section 1, and displays the element on display section 10.

Next, the process of document retrieval according to the first embodiment of the document retrieval device is explained.

Figure 2:
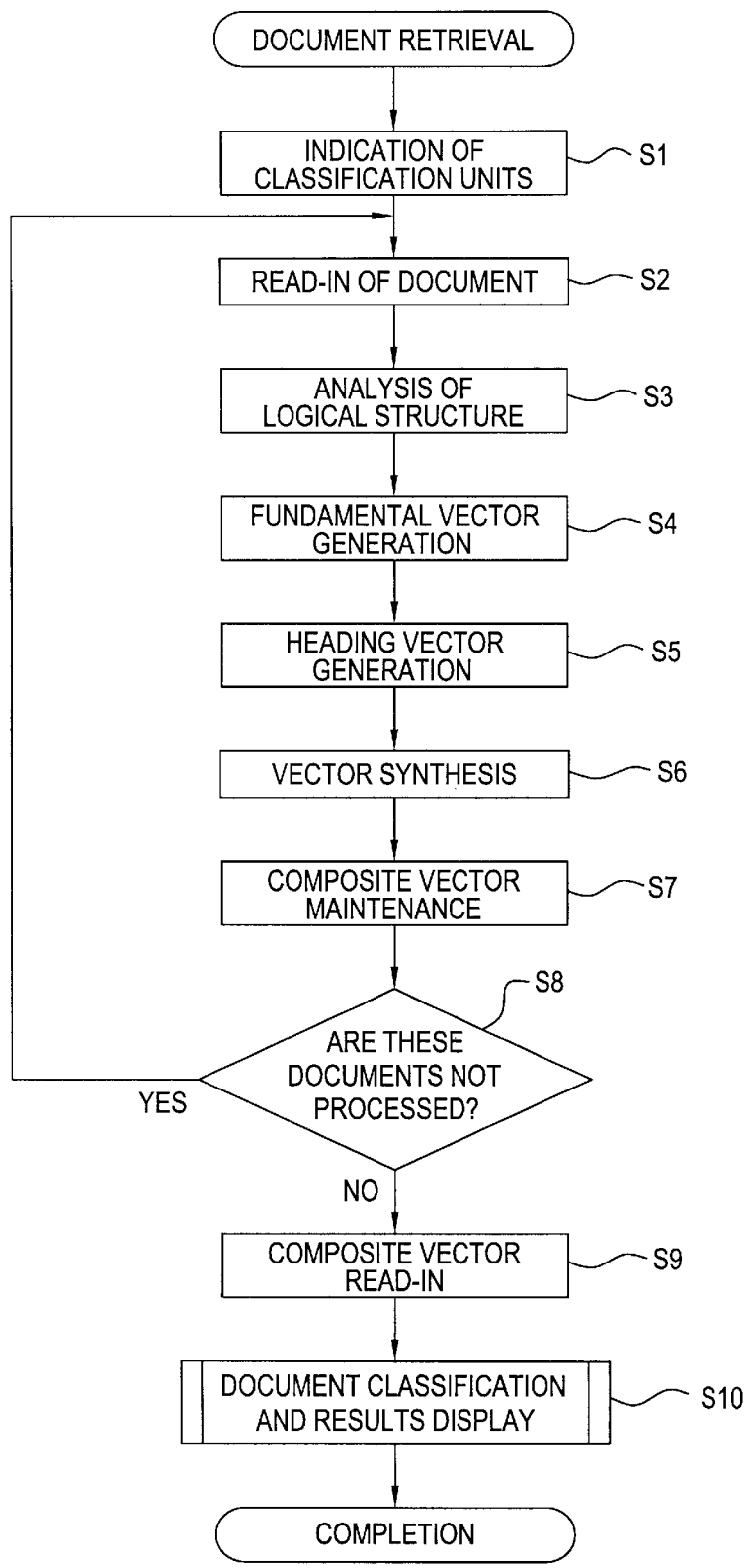
FIG. 2 is a flowchart illustrating the whole body order of document retrieval in the first embodiment of the document retrieval device.

FIG. 2 is a flowchart illustrating the process of document retrieval according to the first embodiment of the document retrieval device.

When document retrieval is performed using the document retrieval device of the present invention, the designation of the classification units is performed by classification unit designation section 2 (step S1). Next, a document is read by the logical structure analysis section 3 from the document storing section 1 (step S2), and the logical structure of the read document is determined (step S3). Fundamental vector generation section 4 generates a fundamental vector for each structural element of the classification units that was analyzed with logical structure analysis section 3 (step S4). Similarly, heading vector generation section 5 generates a heading vector for each structural element of the classification units (step S5).

Vector synthesis section 6 synthesizes fundamental vectors and heading vectors, and generates composite vectors (step S6). Composite vector maintenance section 7 correspondingly attaches the composite vectors to the structural elements of the classification units from which the fundamental vectors were generated, and maintains the attached objects (step S7). Next, a determination is made whether or not the documents remain in document storing section 1, which are yet to be processed through Step S2 to Step S7 (step S8). If documents do remain in document storing section 1, the program proceeds to step S2, and if documents do not remain, the program proceeds to step S9. When no documents remain, the vectors have been generated relative to all of the documents to be retrieved. Classification section 8 reads in the composite vectors that were maintained at composite vector maintenance section 7(step S9), the documents are classified, and these results are displayed on the display section 10 (step S10).

Next, an explanation is given of the order relative to the processing of the classification and the display of the results according to step S10 of the flowchart in FIG. 2.

Figure 3:
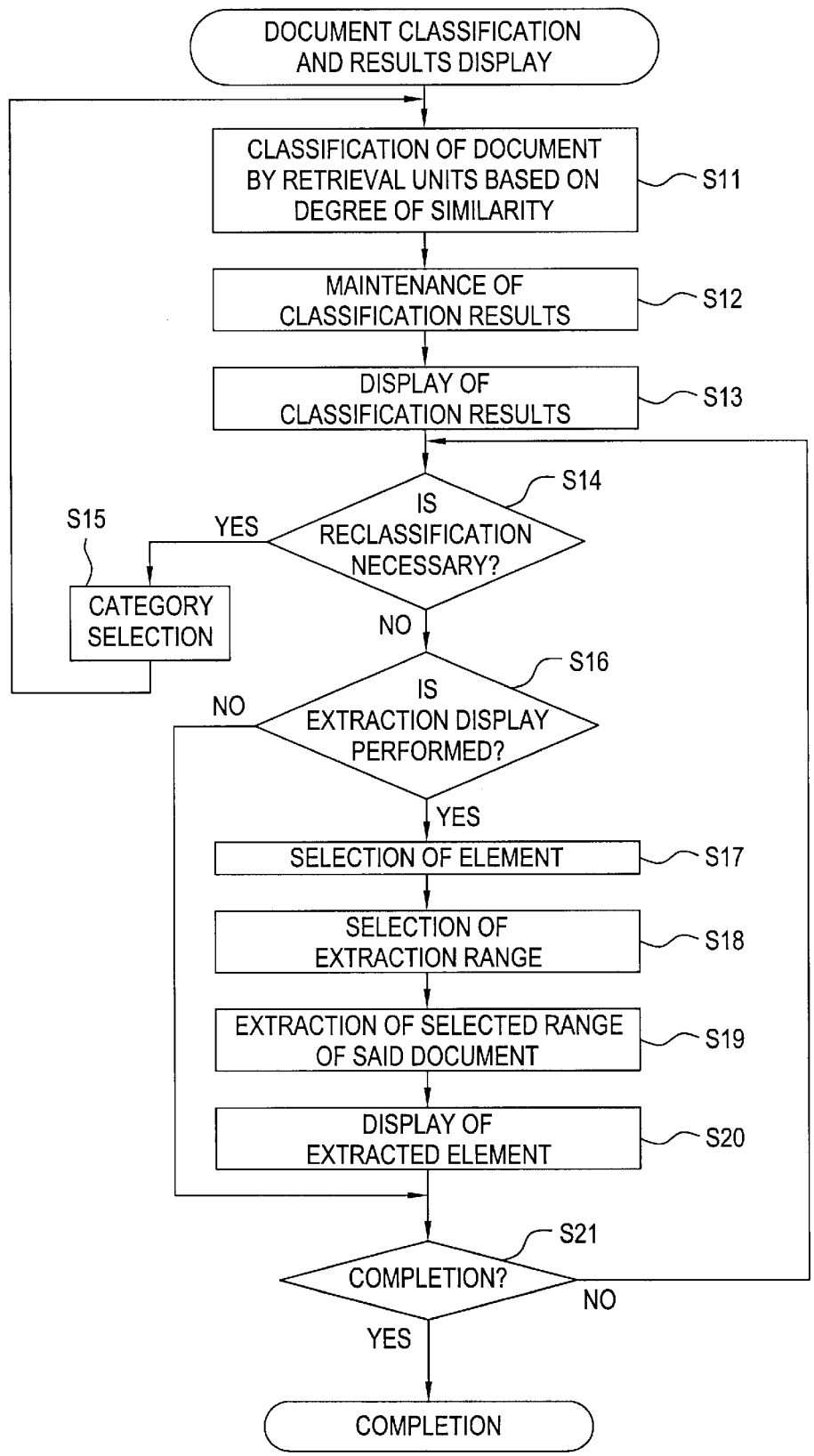
FIG. 3 is a flowchart illustrating the order of the results display and classification of the documents in the first embodiment of a document retrieval device.

FIG. 3 is a flowchart that illustrates the process of classification of the documents and displaying the results.

Classification section 8 classifies all of the documents that was read-in in step S9 of FIG. 2 into one or more categories (step S11) based on the degree of similarity among the composite vectors of every structural element which is the classification unit of each document. Classification results maintenance section 9 maintains the results of the classification that was performed at step S11 (step S12). Also, display section 10 displays the results of classification that was performed in step S11 (step S13).

Next, a determination is made whether reclassification is necessary (step S14) based on the classification results. Upon determining that reclassification is necessary, the selection of categories that are necessary for reclassification are performed at the reclassification indication section 11 (step S15). There may be more than one category selected, and the processing of step S11 to step S14 may be repeated again relative to the categories where reclassification was determined to be necessary.

When reclassification is determined to be not necessary at step S14, a determination is made whether or not the extraction display should be performed (step S16). When the extraction display is performed, an element which is to be displayed is selected with display element selection section 12a (step S17), and the range of the extraction is selected by the display range selection section 12b (step S18). Also, the element of the display range is extracted from document storing section 1 by the display element extraction section 12c (step S19), and displayed on display section 10 (step S20).

When the extraction display is not performed, the classification results are displayed in display section 10. When the extraction display is performed, the extracted element is displayed in display section 10. In either case, a determination is made whether or not this document retrieval process is finished (step S21) based on the display of display section 10, and when it is not finished, the program repeats and proceeds to processing step S14.

Next, an example is given following the flowcharts of FIGS. 2 and 3 that explains how the classification and retrieval is performed by the first embodiment of the document retrieval device of the present invention.

Figure 4:
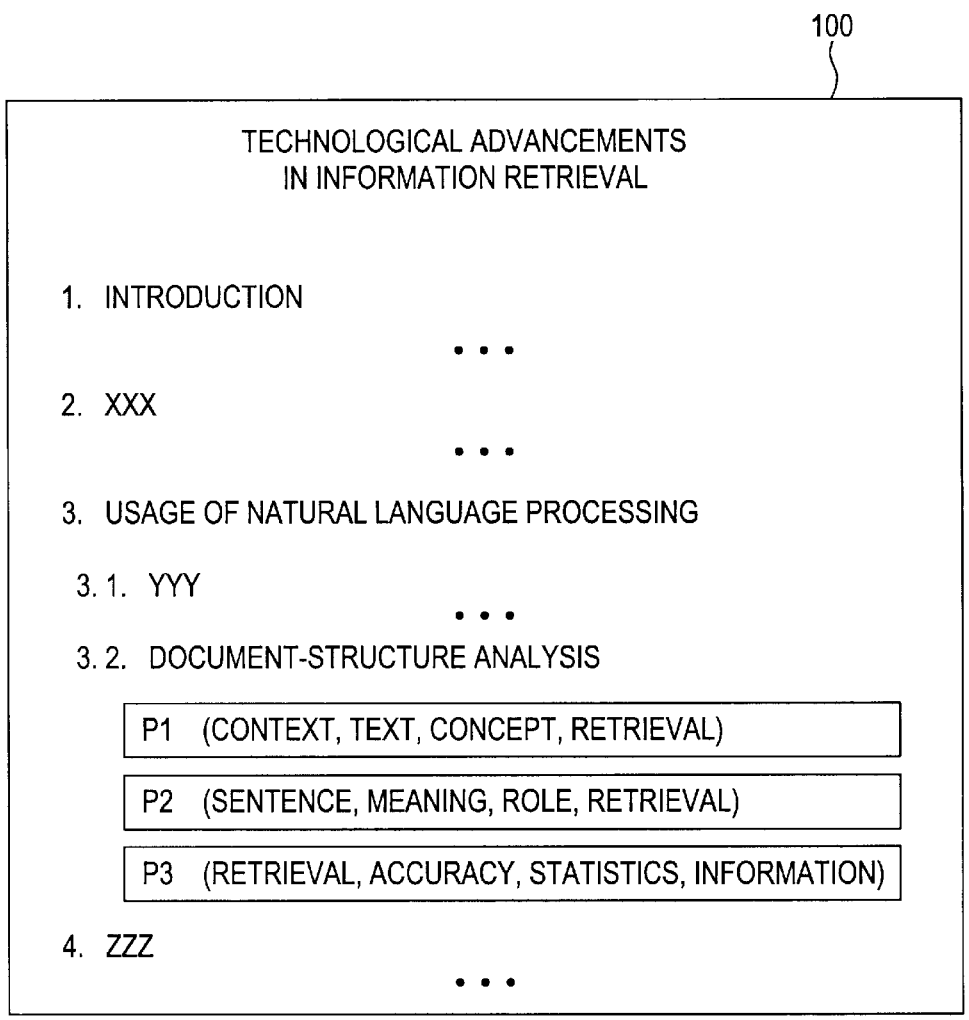
FIG. 4 illustrates an example of a document that is stored in document storing section illustrated in FIG. 1.

FIG. 4 illustrates an example of a document that is stored in document storing section 1 shown in FIG. 1.

Document 100 has the title of "technological advancement in information retrieval". This "document" is composed of multiple "chapters" that have respective "headings", the heading of chapter 1 is "Introduction", the heading of chapter 2 is "XXX", the heading of chapter 3 is "usage of natural language processing", and the heading of chapter 4 is "ZZZ". Also, "chapters" are composed of multiple "sections" having respective "headings". The heading of Chapter 3 Section 1 is "YYY", and the heading of Chapter 3 Section 2 is "Document Structure Analysis". Also, "sections" are further composed of multiple "paragraphs". Paragraph P1 of Chapter 3 Section 2 has content illustrated by key words "context", "text", "concepts", and "retrieval"; Paragraph 2 has content illustrated by means of the key words "sentence", "meanings", "roles", and "retrieval"; and Paragraph P3 has content illustrated by means of the key words "retrieval", "accuracy", "statistics", and "information".

Classification units are determined to be "paragraphs" by the classification unit designation section 2 (step S1 of FIG. 2), and on reading in document 100 at logical structure analysis section 3 as the target, (step S2 of FIG. 2), the logical structure of document 100 is analyzed, and expressed in a tree arrangement (step S3 of FIG. 2).

Figure 5:
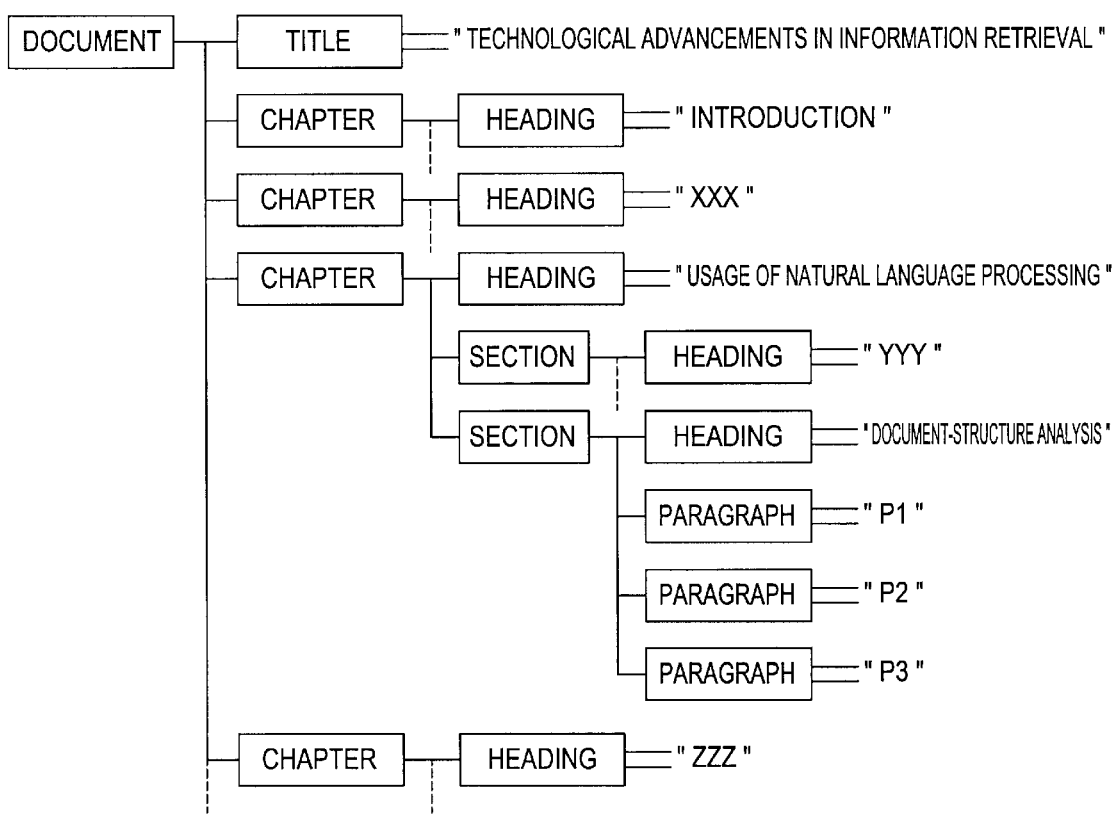
FIG. 5 illustrates the logical structure of a document illustrated in FIG. 4 with the tree arrangement.

FIG. 5 illustrates the logical structure of the document illustrated in FIG. 4 with the tree arrangement.

Here, the structural elements of the document are illustrated as boxes. In FIG. 5, hierarchy of the structural elements from top to bottom is arranged from left to right. Also, following this tree arrangement, any structural elements positioned in upper or lower level of hierarchy can be identified from a specific structural element.

Fundamental vector generation section 4 first reads-in each "paragraph" of document 100 that comprises a classification unit, and extracts key words from the content of each "paragraph". There are various methods for extraction of key words, such as morphological analysis, and simple matching with prepared word list. In the extraction of the key words pertaining to the document retrieval device of the present invention, the prior art technology such as the above is used and there is no particular limitation to the methods used.

Next, fundamental vector generation section 4 performs the calculations according to the following formula (1), and fundamental vectors are generated of t dimensions relative to each "paragraph" based on the k extracted key words (step S4 of FIG. 2). That is, dimension number t is the total number of key words that are used in classification. The determination of dimension number t differs by means of the extraction methods of the key words, and when the prepared word list is used in the extraction of the key words, the total number of the words included in this word list becomes t.

Fundamental vector $A_{pi}$ of a certain structural element $P_i$ is expressed by means of the following equation (1).

$$A_{pi}=(P_{i1}, P_{i2}, \ldots , P_{it}) \tag{1}$$

That is, $P_{ik}$ shows the value of key word k pertaining to structural elements $P_i$. Furthermore, if word k appears in structural element $P_i$, where $P_{ik}=1$, and if word k does not appear in the structural element, $P_{ik}=0$. For the value of this key word k, it is acceptable to place weight according to the frequency of appearance of word k, and degree of dispersion, and the like.

The following is an example of a fundamental vector based on document 100. When using as a word list "information, retrieval, technology, advancement, natural, language, processing, usage, document, structure, analysis, role, sentence, meaning", fundamental vector $A_{p1}$ of paragraph P1 that includes the key words (context, text, concept, retrieval) is expressed by equation (2).

$$A_{p1}=(0,1,0,0,0,0,0,0,0,0,0,0,0,0) \tag{2}$$

Similarly, fundamental vector $A_{p2}$ of paragraph P2 that includes the key words (sentence, meaning, role, retrieval) are expressed by equation (3).

$$A_{p2}=(0,1,0,0,0,0,0,0,0,0,0,1,1,1) \tag{3}$$

Additionally, fundamental vector $A_{p3}$ of paragraph P3 that includes the key words (retrieval, accuracy, statistics, information) is expressed by equation (4).

$$A_{p3}=(1,1,0,0,0,0,0,0,0,0,0,0,0,0) \qquad (4)$$

Heading vector generation section 5 reads in "headings" ("title" of "document", "heading" of "chapter", "heading" of "section") of all the structural elements that are in a higher level than each "paragraph" within all the structural elements that were analyzed in logical structure analysis section 3. The heading vector of t dimensions is generated relating to each "heading" (step S5 of FIG. 2). In this example, heading vector B is obtained from "title of document" and is expressed by equation (5).

$$B=(B_1, B_2, \ldots, B_t) \qquad (5)$$

$B_k$ shows the values of key word k pertaining to "title of document". Heading vector C, obtained from "heading of chapter", is expressed by equation (6).

$$C=(C_1, C_2, \ldots, C_t) \qquad (6)$$

$C_k$ shows the value of key word k pertaining to "heading of chapter". Heading vector D, obtained from "heading of section", is similarly expressed by equation (7).

$$D=(D_1, D_2, \ldots, D_t) \qquad (7)$$

$D_k$ shows the value of key word k pertaining to "heading of section", wherein only "document", chapter", "section", "paragraph" have been given as the structural elements. In documents that have structural elements other than these, heading vectors are generated similar to equations (5) to (7). Furthermore, equations (5) to (7) that obtain the heading vectors are equations that are substantially the same as equation (1).

Thus, when giving examples of the heading vectors based on document 100, heading vector $B_{100}$ of the document title that includes the key words (information, retrieval, technology, advancement) is expressed by equation (8).

$$B_{100}=(1,1,1,1,0,0,0,0,0,0,0,0,0,0) \qquad (8)$$

Similarly, heading vector $C_{100}$ of Chapter 3 that includes the key words (natural, language, processing, usage) is expressed by equation (9).

$$C_{100}=(0,0,0,0,1,1,1,1,0,0,0,0,0,0) \qquad (9)$$

Also, heading vector $D_{100}$ of Chapter 3 section 2 that includes the key words (document, structure, analysis) is expressed by equation (10).

$$D_{100}=(0,0,0,0,0,0,0,1,1,1,0,0,0) \qquad (10)$$

In this manner, when generating the fundamental vector relative to the structural elements of the classification units and the heading vectors, vector synthesis section 6 synthesizes these vectors, and composite vectors are generated (step S6 of FIG. 2). As a result, composite vector S of a certain paragraph in a certain section in a certain chapter is expressed by equation (11).

$$S=A+w_1D+w_2C+w_3B \qquad (11)$$

In equation (11), A is the fundamental vector, D is a heading vector of a section, C is a heading vector of a chapter, and B is a heading vector of a document title. Also, $w_1$, $w_2$, and $w_3$ represent the weight relative to the respective vectors.

In this weighting, arbitrary values from 0 to some value less than or equal to 1 can result. In general, when the document holds a logical hierarchical structure, the hierarchy of the upper levels show broader concepts than the hierarchy of the lower levels. Therefore, the weighting, $w_r$ is calculated using equation (12).

$$w_r=1/(r+1) \qquad (12)$$

In equation (12), r is the distance from the paragraph which is a classification unit. In other words, the weighting decreases in the order of "section", "chapter", "document", and the weight of the section headings becomes ½, the weight of the chapter headings becomes ⅓, and the weight of the document title becomes ¼. In this manner, classification that places more weight on lower level concepts is suited for cases where the demands of the retrieval are concrete.

FIG. 6 is a chart that illustrates the generation of composite vectors relative to paragraph P2 of document 100 illustrated in FIG. 4.

In FIG. 6, the value that is recorded in the vectors column already has weighting provided. By this means, the weight provided to the section heading is 0.6, the weight provided to the chapter heading is 0.4, and the weight provided to the title is 0.2. Composite vector $V_{P2}$, corresponding to paragraph P2 that is synthesized with vector synthesis section 6, is shown in equation (13).

$$V_{P2}=(0.2, 1.2, 0.2, 0.2, 0.4, 0.4, 0.4, 0.4, 0.6, 0.6, 0.6, 1.0, 1.0, 1.0) \qquad (13)$$

In this manner, when the composite vectors corresponding to each structural element of the classification unit are generated, composite vector maintenance section 7 attaches the corresponding composite vectors to each structural element of the classification unit, and maintains the attached objects (step S7 of FIG. 2).

FIG. 7 relates to document 100 illustrated in FIG. 4, and illustrates the state of composite vector maintenance corresponding to the classification unit "paragraphs". An example is given showing the composite vectors corresponding to paragraph P2 that was previously sought.

If the documents that should be the target of the retrieval still remain in document storing section 1, the same processing discussed above is performed again (the program proceeds to step S2 from step S8 of FIG. 2), however the following explanation applies only where document 100, illustrated in FIG. 4, is the target of retrieval.

When the generation and the maintenance of the composite vectors corresponding to the structural elements of all the classification units of the documents is completed, classification section 8 reads in all of the composite vectors that are maintained at composite vector maintenance section 7 (step S9 of FIG. 2). Classification section 8 then classifies all the structural elements of the classification unit in documents into one or more categories based on the degree of similarity among the read-in composite vectors (step S11 of FIG. 3).

There are various methods that calculate the degree of similarity of the vectors, such as the method that uses the inner product of the vectors and the method that uses cosine coefficients and the like, and according to the present invention, it is acceptable for prior art methods to be arbitrarily applied. Also, various clustering methods can be used pertaining to multivariate analysis as methods of classification.

The results of classification are maintained in classification result maintenance section 9 (step S12 of FIG. 3), and displayed on display section 10 (step S13 of FIG. 3). Based on document 100 illustrated in FIG. 4, an example is given of a display picture screen of display section 10 that displays the classification results.

Figure 8:
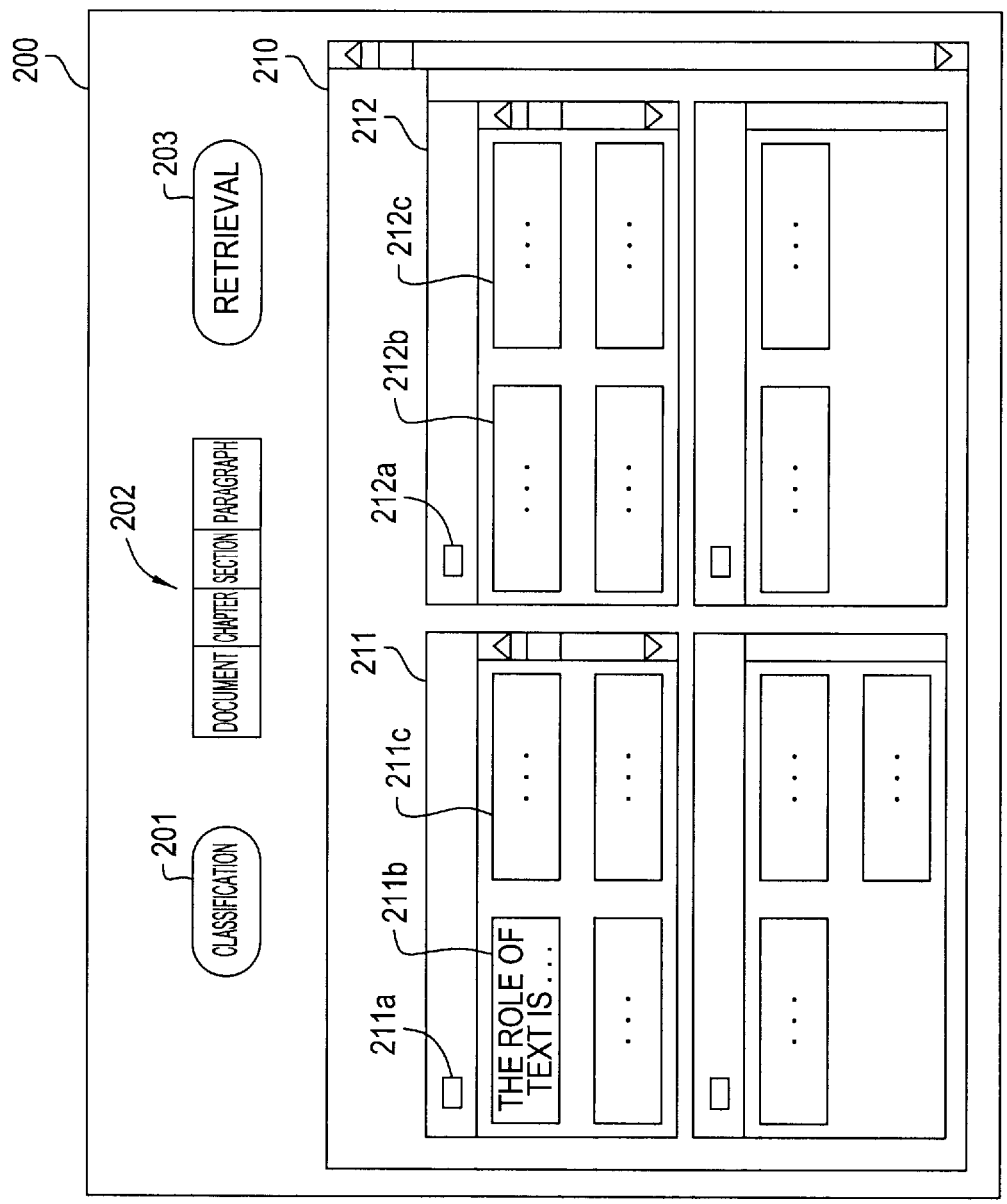
FIG. 8 illustrates an example of the display screen of the classification results.

FIG. 8 illustrates an example of a display picture screen of the classification results.

In display picture screen 200, there is a category display window 210 that displays a categories that comprises the classification result, the classification button 201 that indicates reclassification, the range selection button 202 that selects the display range when the extraction display of the retrieved document is performed, and the document extraction button 203 that indicates the extraction display of the retrieved document.

In the category display window 210, categories 211, 212, etc. are displayed, comprising the results of the classification. In each category, there are selection check boxes 211$a$, 212$a$, etc. which are used for selection of categories. Also, in each category, there are element display entries 211$b$, 211$c$, . . . , 212$b$, 212$c$, . . . , etc. which indicate the structural elements of the classification units which are classified into each category. Furthermore, in the category display window 210, as well as categories 211, 212, etc., scroll bars are generated as needed.

Various methods are considered in the way that the structural elements of the classification units are displayed in element display entries 211$b$, 212$b$, etc. For example, methods that cause a fixed length character string to be displayed from the front of the contents of the structural elements of each classification unit, or a method that causes the key words that are extracted from the contents of the structural elements of each classification unit to be displayed, or if there is a method that identifies at a glance the structural elements of the classification units, or the like, any of these methods are acceptable. Furthermore, by means of display picture screen 200 illustrated in FIG. 8 to FIG. 10, the methods that display a fixed length character string from the front of the contents of the structural elements of each classification unit is shown. Also, range selection button 202 of display picture screen 200 is structured to be able to select the scope from "document", "chapter", "section", and "paragraphs", and furthermore, in the case that the documents that have a more complex logical structure are to be retrieved, range selection button 202 is structured so that the range can be selected based upon those structures.

In this manner, a determination can be made whether the reclassification of the categories is necessary from the results of the classification that were displayed (step S14 of FIG. 3). Where reclassification is determined to be necessary, one or more categories are selected which should be reclassified from the categories that were obtained as the classification results (step S15 of FIG. 3).

The method that indicates reclassification with the display picture screen illustrated in FIG. 8 is explained.

Figure 9:
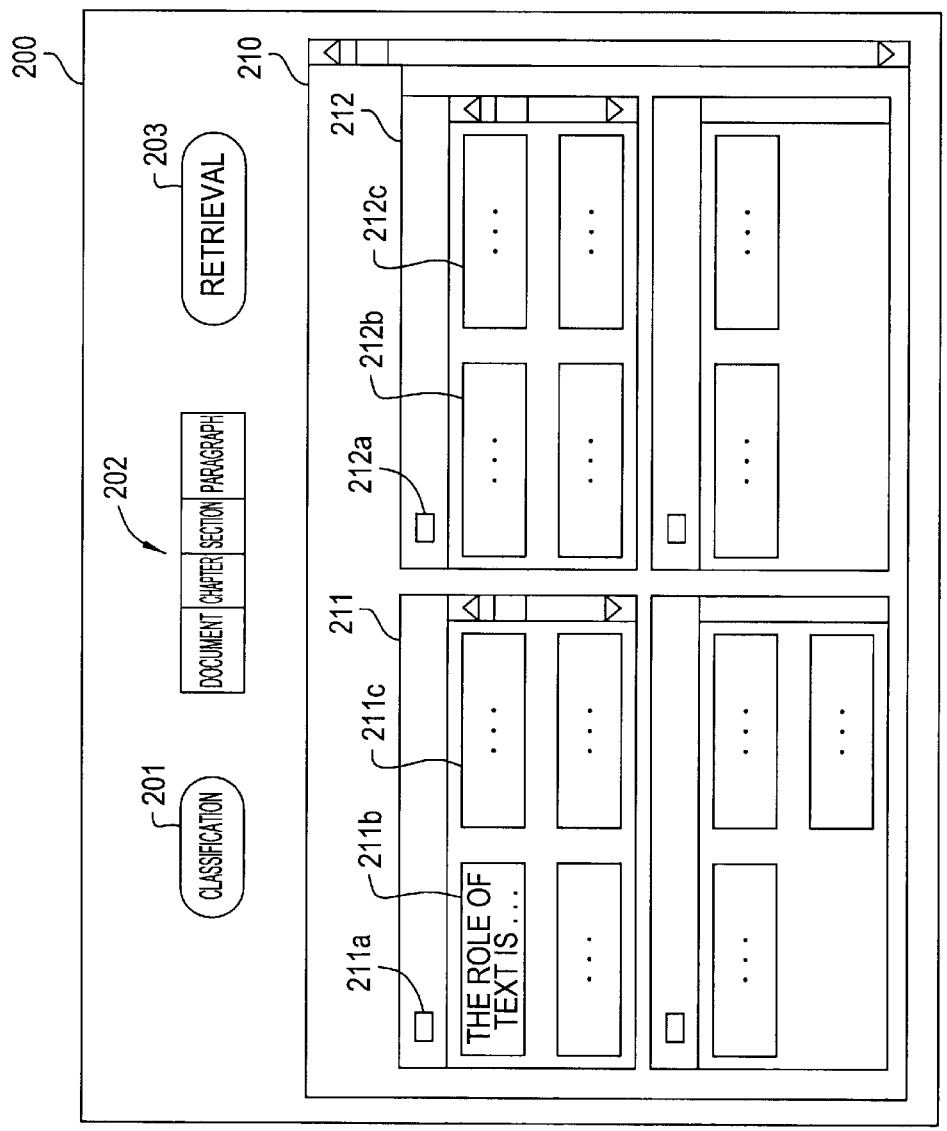
FIG. 9 illustrates the indication of reclassification in the display screen illustrated in FIG. 8.

FIG. 9 shows the situation where reclassification is indicated in the display picture screen illustrated in FIG. 8.

The selection of the categories is performed by means of pointing and clicking selection check boxes 211$a$, 212$a$, etc. by a pointing device such as a mouse. FIG. 9 shows the situation where selection check box 211$a$ was selected, and in selection check box 211$a$, a check mark is entered that shows what has been selected. In this situation, when classification button 201 that indicates reclassification is selected with a pointing device such as a mouse, reclassification is performed of category 211 as the target, by means of classification section 8, and furthermore, category 211 is partitioned into one or more categories. The results of this classification are maintained in classification result maintenance section 9, and displayed in display section 10.

By means of a document retrieval device of the present embodiment, when reclassification is not necessary to displayed classification results, and when a determination cannot be made just from the display screen of whether or not reclassification is necessary, a structural element of the classification unit can be extracted and displayed (step S16 of FIG. 3). When the extraction of the structural element is performed, the structural element which is to be extracted is selected (step S17 of FIG. 3), followed by selection of the range to be displayed (step S18 of FIG. 3).

Figure 10:
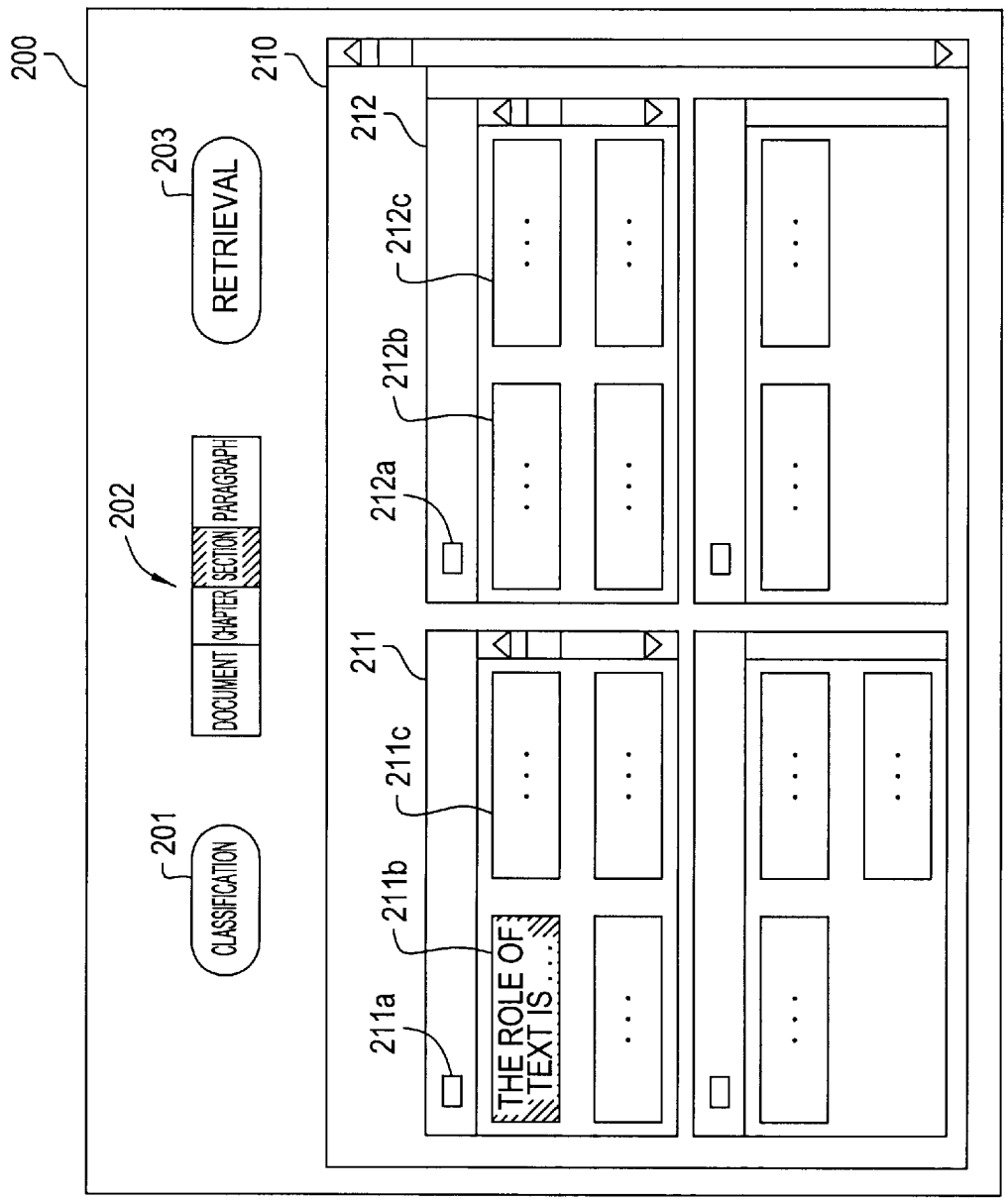
FIG. 10 illustrates the selection of a unit that is displayed in the display screen illustrated in FIG. 8.

FIG. 10 illustrates the situation that indicates the extraction display on the display screen illustrated in FIG. 8.

The selection of the structural elements and the display range is performed with a pointing device such as a mouse or the like. In FIG. 10, element display entry 211$b$ is selected to be displayed, "section" range selection button 202 is selected as a display range, and the state is shown where the selected 2 items can be confirmed by means of reversing the selected items, and the like. In short, element display entries 211$b$, 211$c$, . . . , 212$b$, 212$c$, . . . , etc. that were shown in the category display window 210 of display screen 200 correspond to the display element selection section 12$a$ illustrated in FIG. 1. Similarly, range selection button 202 of display screen 200 corresponds to the display range selection section 12$b$ illustrated in FIG. 1. Also document extraction button 203 corresponds to display element extraction section 12$c$ illustrated in FIG. 1. Therefore, upon selecting document extraction button 203 with a pointing device such as a mouse or the like in this situation, the selected range and selected element are extracted from the documents that is stored in the document storing section 1 (step S19 of FIG. 3). Also, the selected range and the selected element of the documents that were extracted are displayed in display section 10 (step S20 of FIG. 3).

Figure 11:
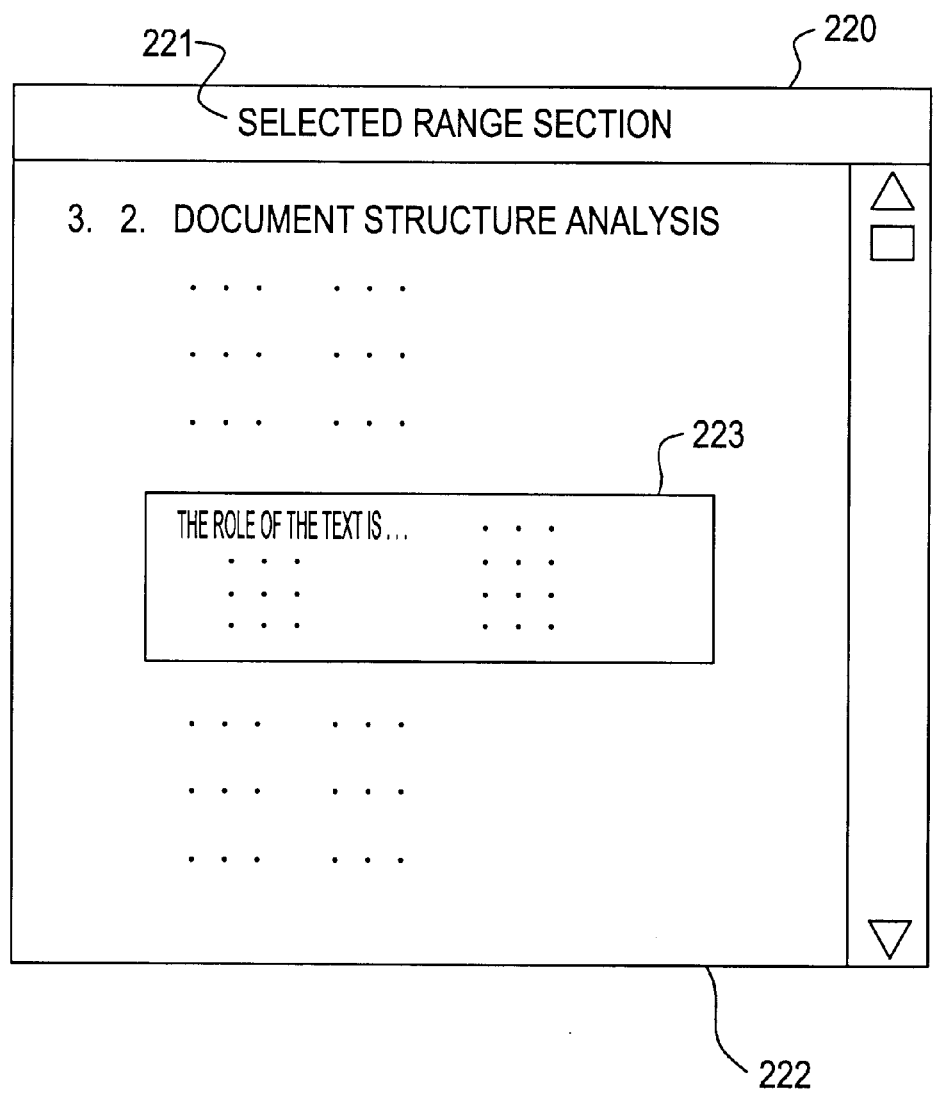
FIG. 11 is an example of a displayed screen of the retrieved document.

FIG. 11 is an example of the display screen of the extracted element.

On display screen 220, range name display area 221 displays the structural element names of the selected range, range content display area 222 displays the content of the element of the selected and extracted range, and extracted element display area 223 displays the selected elements. According to the indication illustrated in FIG. 10, paragraph P2 of chapter 3 section 2 of document 100 illustrated in FIG. 4 is displayed as an extracted element, and the section that include paragraph P2 is displayed as the selected range as well. Furthermore, a scroll bar is generated as needed on display screen 220.

Furthermore, if reclassification is determined to be necessary, the process proceeds to the classification of the documents by means of classification section 8 once again, and if this is not necessary, document retrieval process is completed (step S21 of FIG. 3).

In this manner, according to the document retrieval device of the present invention, the stored documents are partitioned by arbitrary classification units, and the structural elements which have high degree of similarity tend to be classified into the same category, with taking into consideration the headings of the structural elements that are arranged in the upper level of the classification units, and only the structural elements of the classification units that contain the required topic can be obtained from the generated categories. Subsequently, because detailed contents can be displayed on demand, it is possible to simply extract just the necessary topics from large volume documents and huge documents and the like. The extracted element is displayed as enlargements in FIG. 11, and it is acceptable to make distinction of the extracted element by means of a method where it is enclosed simply by a rectangle, underlined, and the like.

An explanation is provided hereafter with reference to the second embodiment of the document retrieval device of the present invention.

By means of the second embodiment, document retrieval is performed where the documents do not have explicit hierarchical logical structure by means of the document retrieval device that is shown in the first embodiment of the present invention. The device construction of this embodiment is the same as the device construction of the first embodiment illustrated in FIG. 1. Also, the document retrieval process is executed with the processing order similar to that of the flowchart illustrated in FIGS. 2 and 3.

Documents, for example, Hyper Text Markup Language (HTML) documents that are disclosed on the World Wide Web are stored in the document storing section 1, and can be classified and retrieved. HTML is a practical application of Standard Generalized Markup Language (SGML; ISO8879) that comprises an international standard of structured documents, and the document structure is regulated by means of Document Type Definition (DTD).

The DTD of HTML can not express hierarchically logical structure, but by means of the present embodiment, the size of the heading is considered as corresponding to some hierarchical level (the DTD of HTML can declare the importance of the elements, in that the size of the characters that are displayed differ by their importance). Also, a hierarchical structure can be acquired by the chapter numbers and the section numbers that appears in the document.

An example is given where the HTML documents are classified with a document retrieval device of a second embodiment of the present invention. For further explanation, the symbols of FIGS. 1 to 3 which comprise the components of a document retrieval device and the steps of the document retrieval process that are used for the explanation of the first embodiment will be referenced.

FIG. 12 illustrates an example of an HTML document 110 that is stored in the document storing section 1 illustrated in FIG. 1.

In document 110, each element in the document is enclosed by a begin tag and an end tag. For an element A, the begin tag is shown as <A> and the end tag is shown as </A>. Therefore, document 110 is first enclosed by means of the begin tag <HTML> and an end tag </HTML> that shows the whole body of the document.

Document 110 also comprises the heading element (HEAD) and the main body element (BODY), and the heading element further comprises the title element (TITLE). The main body element comprises the heading elements (H2 and H3) and the paragraph elements (P). Furthermore, by the DTD of HTML, six varieties of H1 to H6 are declared as the heading elements, where H1 is used for the heading with the highest importance, and H6 is used for the heading with the lowest importance.

Where hierarchical headings are structured in general, the headings with the higher importance are described in hierarchically higher level. Therefore, the method of logical structure analysis by this means analyzes the logical structure with element H2 as the Chapter heading and element H3 as the section heading and obtains the hierarchical structure. Also, logical structure is analyzed from the chapter numbers and section numbers described with the headings.

Classification units are made to be "paragraphs" with classification unit designation section 2 (step S1 of FIG. 2), and upon reading in document 110 illustrated in FIG. 12 at logical structure analysis section 3 (step S2 of FIG. 2), the logical structure of the document is analyzed, and the title element "TITLE", the heading elements "H2 and H3", and the paragraph elements "P" are identified and expressed as a tree arrangement (step S3 of FIG. 2).

Figure 13:
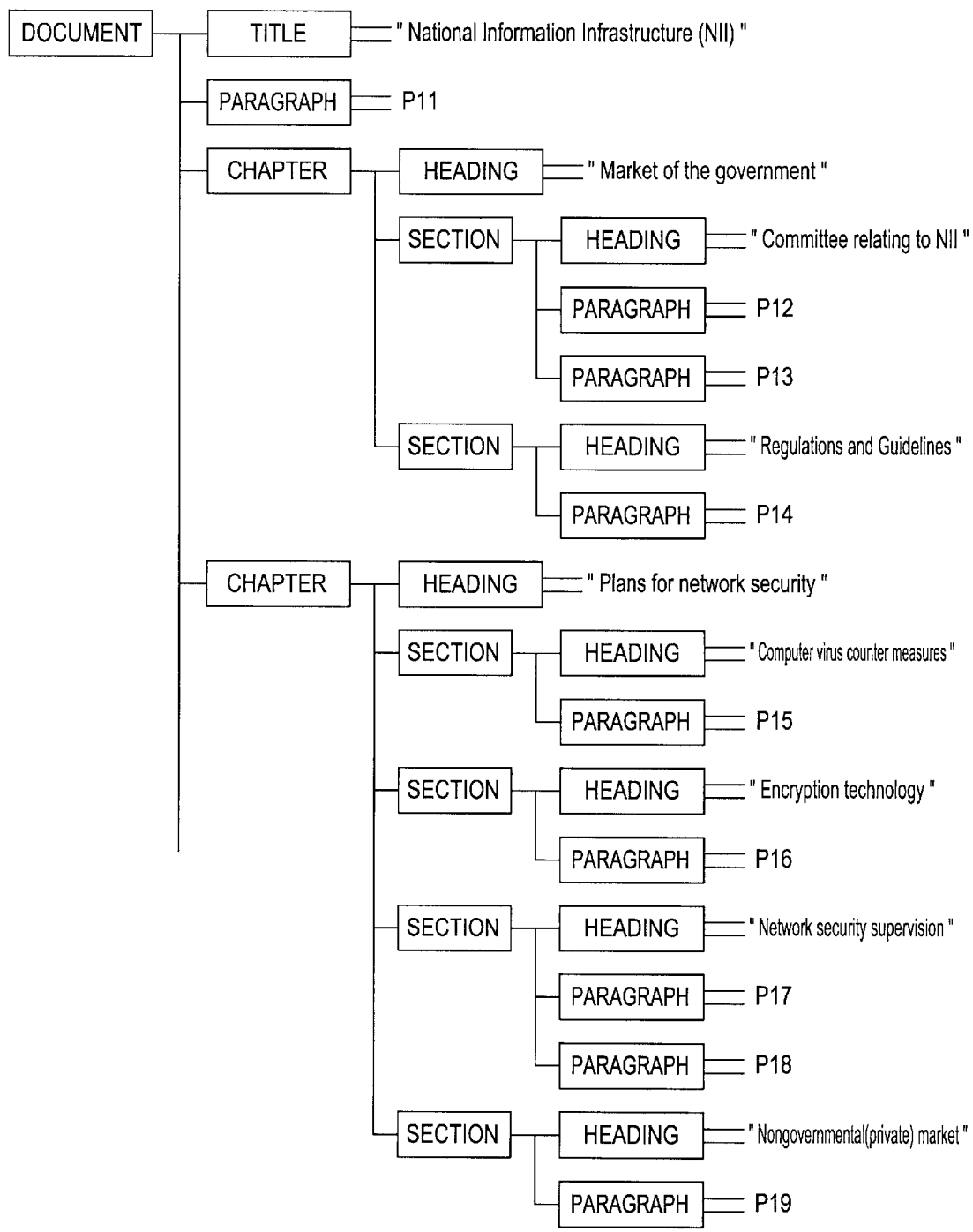
FIG. 13 illustrates the logical structure of a document illustrated in FIG. 12 having a tree arrangement.

FIG. 13 illustrates the logical structure of the documents illustrated in FIG. 12 with a tree arrangement.

Fundamental vector generation section 4 first reads in document 110 at each "paragraph" that is a classification unit, and extracts key words from the content of each "paragraph". In this manner, the extraction method of the key words uses prior art technologies and is not especially limited by one method.

Next, fundamental vector generation section 4 performs the calculations illustrated by the equation (1), and a fundamental vector of t dimensions relative to each paragraph is generated (step S4 of FIG. 2).

In this manner, where hierarchical logical structure of the documents is not explicitly expressed like document 110, the weight is provided according to the appearance frequency and degree of dispersion of word k at each value of $P_{ik}$ in equation (1), and it is necessary for normalization to be performed so that the norm of the fundamental vector becomes 1. Influence caused by the differences in the text amount of "paragraphs" and "headings" can be eliminated by means of the normalization such that the norm of the fundamental vector becomes 1.

For example, where the total number of paragraphs contained in target documents is N, value $P_{ij}$ of the element of j numbers (j=1, ..., t) of the vector $A_{Pi}=(P_{i1}, P_{i2}, ..., P_{it})$ of the paragraphs of i numbers (i=1, ..., N) using Term Frequency (TF) and Inverse Document Frequency (IDF), are shown in equations (14), (15).

$$P_{ij}=f_{ij}*g_j \qquad (14)$$

$$g_j=\text{Log}(N/d_j) \qquad (15)$$

Here, $f_{ij}$ corresponds to TF by the appearance frequency of the words of j numbers in the paragraphs of I numbers. Also, $g_j$ corresponds to IDF and $d_j$ shows the number of paragraphs where the words of j numbers appear. By this means, $A'_{Pi}$ that normalizes $A_{Pi}$ so that the norm becomes 1 is calculated using the following equation (16).

$$A_{Pi} = \frac{A_{Pi}}{\sqrt{\sum_{j=1}^{t} P_{ij}^2}} \qquad (16)$$

This $A'_{Pi}$ is used as the fundamental vector by the present embodiment. Where a fundamental vector is generated for, for example, paragraph P18 of section 3 of chapter 2 of document 110 illustrated in FIG. 12, the key words from paragraph P18 (NIST, recent, produce, computer, security, handbook, ...) is extracted. Also, the term frequency (TF) and the inverse document frequency (IDF) of each key word is calculated, and the fundamental vector $A'_{P18}$ is generated and normalized so that the norm becomes 1.

Next, the heading vector generation section 5 reads in all of the "headings" ("titles", "chapter headings", "section headings") that are in the upper levels than each "paragraph" in all the logical structural elements retrieved in the logical structure analysis section 3. Also, the heading vectors of t dimensions relating to each "heading" are generated (step S5 of FIG. 2). Furthermore, the weight is provided in each heading vector based on the appearance frequency and dispersion of the words, just like the fundamental vectors, and normalization is performed to each heading vector so that the norms of the heading vectors become 1.

In relation to paragraph P18 of document 110 illustrated in FIG. 12, key words are extracted from headings of upper levels, which are the title "National Information Infrastructure (NII)" of the document, "Plans for Network Security" which is the headings of Chapter 2, and "Network Security Supervision" which is the heading of Chapter 2 Section 3. The appearance frequency and dispersion of each key word is calculated, and heading vectors are generated that are normalized so that the norms become 1.

Vector synthesis section 6 synthesizes the fundamental vectors and heading vectors that were generated in steps S4 to S5 of FIG. 2 (step S6 of FIG. 2). Furthermore, equation (11) is used to compute the composite vectors, and equation (12) is used to determine the weights in each vector in equation (11), respectively.

When the composite vectors are generated, composite vector maintenance section 7 correspondingly attaches the composite vectors to the structural elements of the classification units and maintains the attached objects (step S7 of FIG. 2). If documents that should be classified still remain in document storing section 1 at this point in time, processing is performed as in the above (the program proceeds to step S2 from step S8 of FIG. 2). When the generation and maintenance of the composite vectors in the structural elements of all the classification units of the documents are completed, classification section 8 reads in all the composite vectors that are maintained at composite vector maintenance section 7 (step S9 of FIG. 2). Also, classification section 8 classifies all of the elements that should be classified into one or more categories based on the degree of similarity of the composite vectors that were read in (step S11 of FIG. 3), and the classification results are maintained in the classification result maintenance section (step S12 of FIG. 3).

Furthermore, the method based on the cosine coefficient is used as a calculation method of the degree of similarity of the vectors. In relation to the calculation methods of the degree of similarity of vectors based on cosine coefficients, reference is made to equation (20). Also, k-means clustering is used which is a well-known classification method.

Thus, the experimental results are explained which actually classify the documents in accordance with the present embodiment.

33 HTML documents, which are the serials titled "New York Resident Reports" in the "Denshi Kougyo Geppou (Electronic Industry Monthly Report)" from June, 1994 to February, 1997 that JEIDA (Japan Electronic Industry Development Association) disclosed on the WWW, is used as an experimental set of documents to be classified, and are partitioned into 1635 paragraphs and classification is performed of the documents.

FIG. 14 is a classification table that illustrates the results which manually classify the documents in the experimental set.

All of the 33 documents in the experimental set are related to the movement direction of the information industries of the USA, and in each category of the classification table illustrated in FIG. 14, appropriate topics are assigned which are derived from the contents of the paragraphs that are included in those categories. Furthermore, the number of categories is 27, and each category includes paragraphs of as few as 8 items and as many as 164 items. Also, the classification results that show this classification table will be referred to as the standard set.

The above 33 HTML documents are stored in the document storing section 1 illustrated in FIG. 1, and following the processing order illustrated in the flowcharts of FIGS. 2 to 3, the processed results are compared with the standard set.

An explanation is provided concerning the k-means clustering. Following this, "clusters" are made to be synonymous with "categories".

Number k of clusters to be generated is provided as the parameter with k-means clustering. The initial values of the cluster center of k items are appropriately selected from among the sample vectors.

Number k of clusters is set to be the number of categories of the standard set illustrated in FIG. 14, or in other words, k=27, in order to compare the result with the standard set which is the result of a manual classification. Also, the initial values of the cluster center of k items are selected from the paragraphs with the highest degree of similarity relative to the topics of each category of the standard set illustrated in FIG. 14.

The degree of similarity between the topics of each category and the "paragraphs" can be calculated by means of the calculation of the degree of similarity between the vectors generated from the topics, and the fundamental vectors of each "paragraph" by formulas that use for example, cosine coefficients.

Thus, the number of clusters that were generated along the processing order shown in the flowcharts of FIGS. 2 to 3 can be arranged into the number of categories of the standard set. Also, it can be expected that the clusters corresponding to the topics of each category of the standard set will be generated.

Furthermore, in relation to the topics of each category of the standard set, the fundamental vectors of the "paragraphs" with the highest degree of similarity are selected as the initial values of the cluster center, in order to make comparisons with the standard set resulted from manual classification. Practically, the initial values of the cluster center can be selected arbitrarily.

When the category set of the standard set is made to be $\{C_1, C_2, \ldots, C_m\}$ and the cluster set of the results of classification in the second embodiment are made to be $\{C'_1, C'_2, \ldots, C'_m\}$, then the number of elements included in cluster A, n(A), and the number of elements that are in common between cluster A and cluster B is $n(A \cap B)$. Also, the total number of the structural elements that are to be classified is made to be N.

The solution ratio S relative to the standard set is now sought and solved for by equation (17).

$$S = \frac{\sum_{i=1}^{m} n(C_i \cap C_i')}{N} \quad (17)$$

The solution ratio S of the experimental results, calculated from equation (17), is 70.6%. In contrast, where step S5 and step S6 of FIG. 2 are abbreviated, or where only the fundamental vector is maintained at composite vector maintenance section 7, the solution ratio S of the classification results becomes 55.6%. In other words, the heading vector is synthesized with the fundamental vector, and the solution ratio S improves by 15.0% by performing the classification.

As previously discussed, the stored documents are partitioned by arbitrary classification units in the second embodiment of a document retrieval device of the present invention. The structural elements which have high degree of similarity tend to be classified into the same category, with taking into consideration the headings of the structural elements that are arranged in the upper level of the classification units as well as the text length of the headings, and only the structural elements of the classification units that contain the required topic can be obtained from the generated categories. Upon completion, it is possible to simply extract only the necessary topics from lengthy documents because the detailed contents can be displayed on demand.

In this manner, the contents of each classification unit of the document which is to be retrieved, and the headings of the structural elements that are arranged in higher levels than these classification units, are expressed as the key words by a document retrieval device of the present invention. The structural elements of the documents are classified based on the degree of similarity of the composite vectors that were generated from the key words. As a result, structural elements with the associated headings having a high degree of similarity and mutual relevance can be retrieved and displayed.

Figure 15:
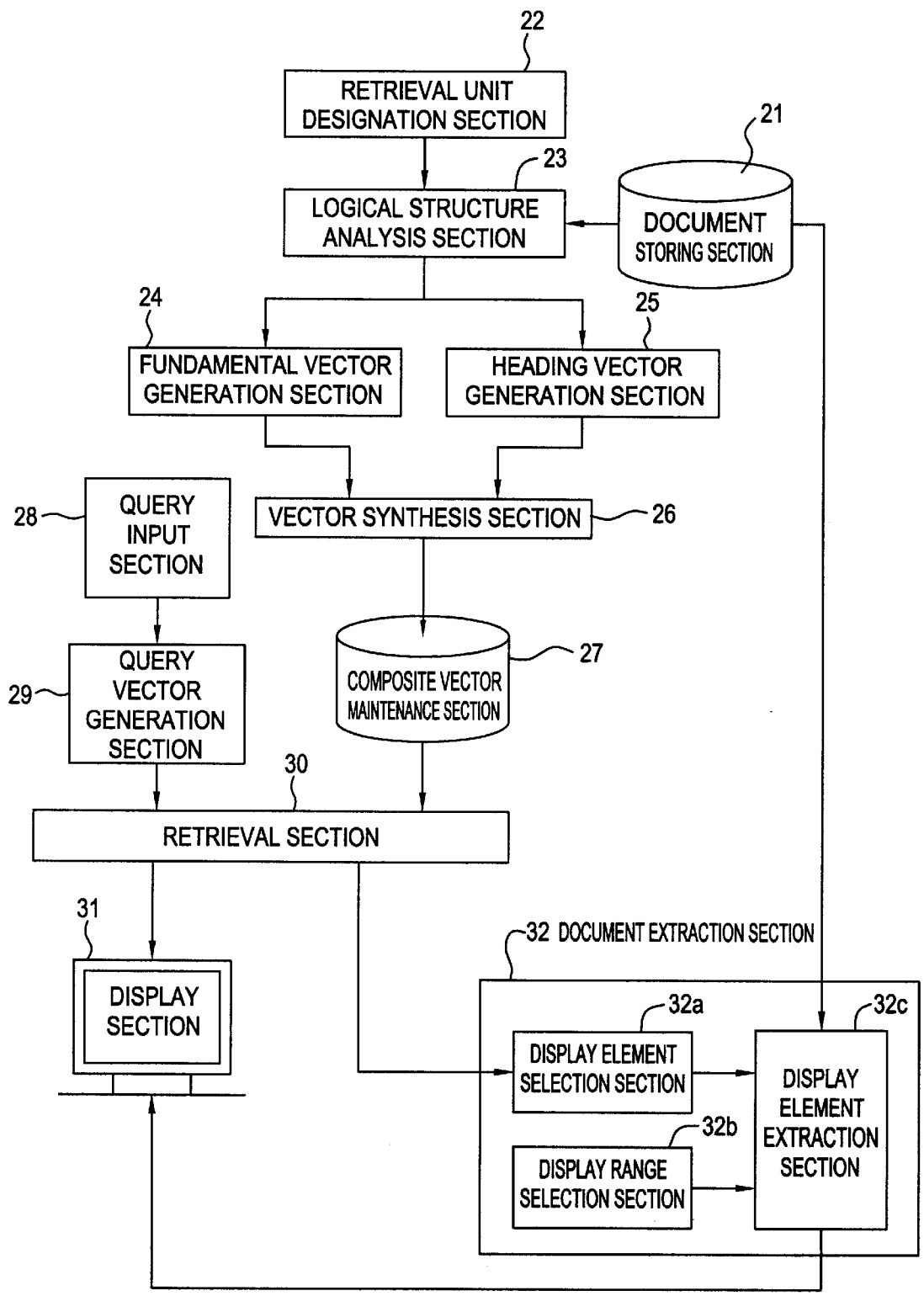
FIG. 15 illustrates the fundamental construction of the third embodiment of a document retrieval device of the present invention.

FIG. 15 illustrates the fundamental structure of the third embodiment of a document retrieval device of the present invention.

The third embodiment of a document retrieval device is composed of a document storing section 21, a retrieval unit designation section 22, a logical structure analysis section 23, a fundamental vector generation section 24, a heading vector generation section 25, a vector synthesis section 26, a composite vector maintenance section 27, a query input section 28, a query vector generation section 29, a retrieval section 30, a display section 31, and a document extraction section 32.

Document storing section 21, logical structure analysis section 23, and vector synthesis section 26 are components which are identical to document storing section 1, logical structure analysis section 3, and vector synthesis section 6 of the first embodiment, illustrated in FIG. 1. Additionally, the display section 31 and the document extraction section 32 are components that are the same as the display section 10 and the document extraction section 12 of the first embodiment illustrated in FIG. 1. Display element selection section 32a, display range selection section 32b, and display element extraction section 32c are components which are also the same as the display element selection section 12a, display range selection section 12b, and the display element extraction section 12c illustrated in FIG. 1.

The retrieval unit designation section 22 designates whether the retrieval units comprise "documents", "chapters", "sections", or "paragraphs", or the like. Fundamental vector generation section 24 partitions the logical structure of the document analyzed with logical structure analysis section 23 by means of the retrieval units that were designated by retrieval unit designation section 22, and extracts key words from each structural element of the retrieval units. The fundamental vectors are generated based on these key words.

Heading vector generation section 25 extracts key words from the headings of all of the structural elements that are arranged in higher level than the structural elements of the retrieval units from which the fundamental vectors were generated by fundamental vector generation section 24 in the logical structure of the document that was analyzed by logical structure analysis section 23, and generates heading vectors based on these key words. Composite vector maintenance section 27 attaches the composite vectors that were generated by vector synthesis section 25 to the corresponding elements of the retrieval units from which the fundamental vectors were generated by the fundamental vector generation section 24, and maintains the attached objects.

Query input section 28 receives the input of the query of retrieval that comprises key word list or natural language text. Query vector generation section 29 generates the query vector from the query received with query input section 28. Also, retrieval section 30 reads in the query vector that was generated by the query vector generation section 29 and composite vectors that were maintained by the composite vector maintenance section 27. The degree of similarity between the query vector and composite vectors is calculated, and the structural elements of the retrieval units that were attached to the composite vectors with the highest degree of similarity are retrieved.

Figure 16:
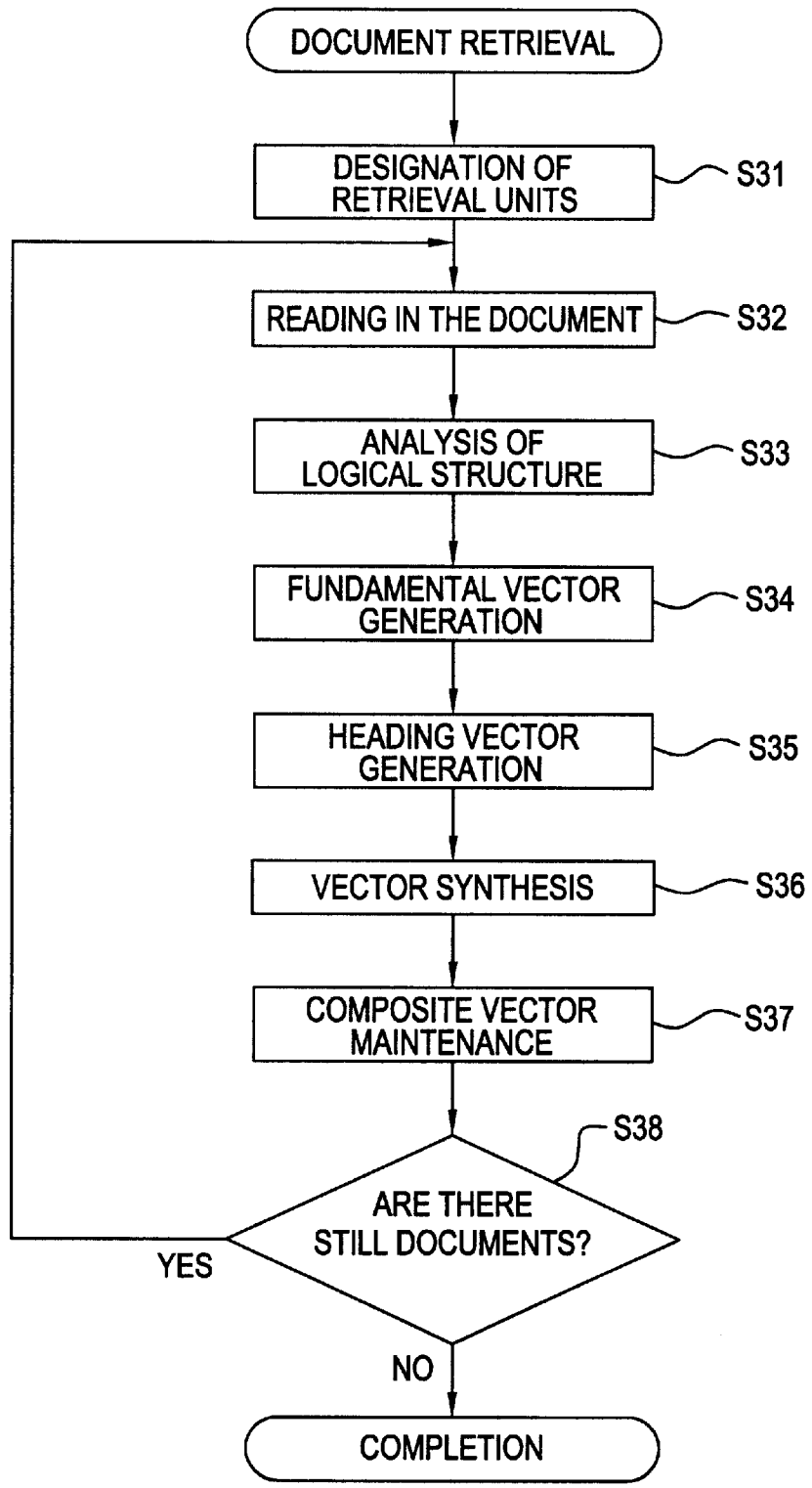
FIG. 16 is a flowchart illustrating the order that the preparation of the document retrieval is performed in the third embodiment of a document retrieval device.

FIG. 16 is a flowchart that illustrates the preparation order of document retrieval in the third embodiment of the document retrieval device.

Where document retrieval is performed in the third embodiment of the document retrieval device of the present invention, the retrieval units are designated by the retrieval unit designation section 22 (step S31). Next, logical structure analysis section 23 reads in one document from document storing section 21 (step S32), and the logical structure of the read-in document is analyzed (step S33). Fundamental vector generation section 24 generates fundamental vectors for each structural element of the retrieval units of the logical structure that was analyzed with logical structure analysis section 23 (step S34). Heading vector generation section 25 also generates heading vectors for each structural element of the retrieval units similarly to fundamental vector generation section 24 (step S35).

Vector synthesis section 26 synthesizes the fundamental vectors and heading vectors, and generates a composite vector (step S36). Composite vector maintenance section 27 correspondingly attaches the composite vectors to the structural elements of the retrieval units from which the fundamental vectors were generated, and maintains the attached objects (step S37). Next, a determination is made whether or not documents remain in document storing section 21 which are the target of the processing of steps S32–37 (step 38). If documents remain, the program returns to step S32. If no documents remain, the processing in the flowchart is completed. The fact that no documents remain in the determination of step S38 indicates that vectors have been generated for all of the documents that comprise retrieval targets. After the preparation of the document retrieval illustrated in FIG. 16 is complete, the document retrieval is actually performed.

Figure 17:
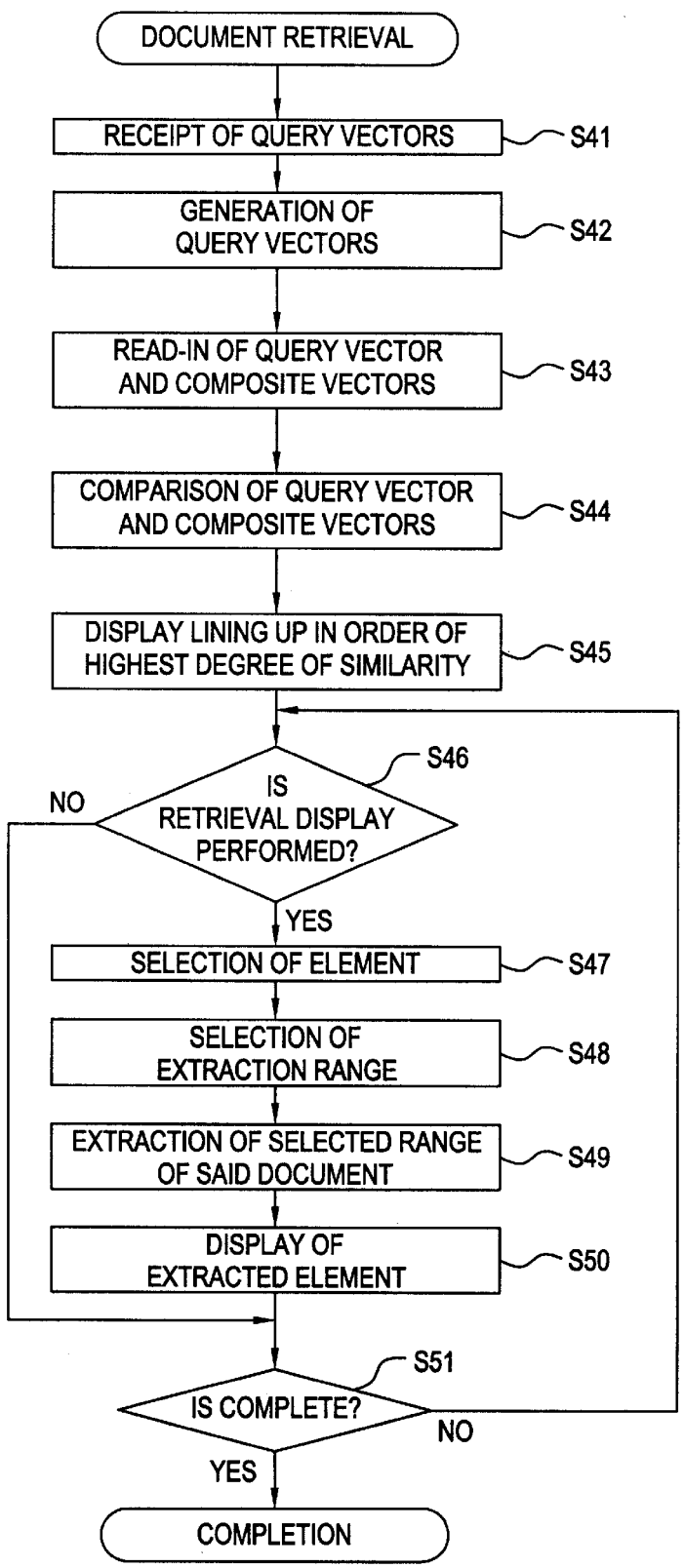
FIG. 17 is a flowchart illustrating the order of document retrieval processing that was performed after the document retrieval preparation was completed in the third embodiment of a document retrieval device.

FIG. 17 is a flowchart illustrating the order of the document retrieval processing that is performed after the completion of the document retrieval preparation in the third embodiment of the document retrieval device.

When document retrieval is performed in the third embodiment of a document retrieval device of the present invention, a query is input by query input section 28 (step S41). If the query that was input is a key word list, a query vector is generated directly from these key words. If the input is natural language text, key words are extracted from the content, and a query vector is generated from these extracted key words (step S42).

After the query vector was generated, the retrieval section 30 reads in the query vector from the query vector generation section 29, and reads in all of the composite vectors from the composite vector maintenance section 27 (step S43). A comparison of query vector and composite vectors is performed (step S44) and displayed the composite vectors on display section 31 along with the structural elements of the corresponding retrieval units in descending order of the degree of similarity with the query vector (step S45).

From the processing up to this point, the document retrieval itself is tentatively finished, and a determination is made whether or not to perform the extraction display of the retrieved document based on the results of the document retrieval (step S46). Where the extraction display is performed, structural elements are selected that are to be displayed with display element selection section 32a (step S47), and a range of the extraction display is selected with display range selection section 32b (step S48). Also, the element of the display range is extracted from document storing section 21 with display element extraction section 32c (step S49), and displayed on display section 31 (step S50).

Where extraction display is not performed at this point, the results of document retrieval are displayed in display section 31. In the case where the extraction display is performed, the extracted element is displayed in display section 31. In either case, a determination is made whether or not the document retrieval processing is completed based on the display of display section 31 (step S51), and where it is not completed, the program proceeds again to the processing following step S46, and it is possible to perform a extraction display relative to different structural elements.

In the case where document retrieval is performed with a document retrieval device of the third embodiment, an example is given of an input output screen that inputs query and displays the retrieval results.

Figure 18:
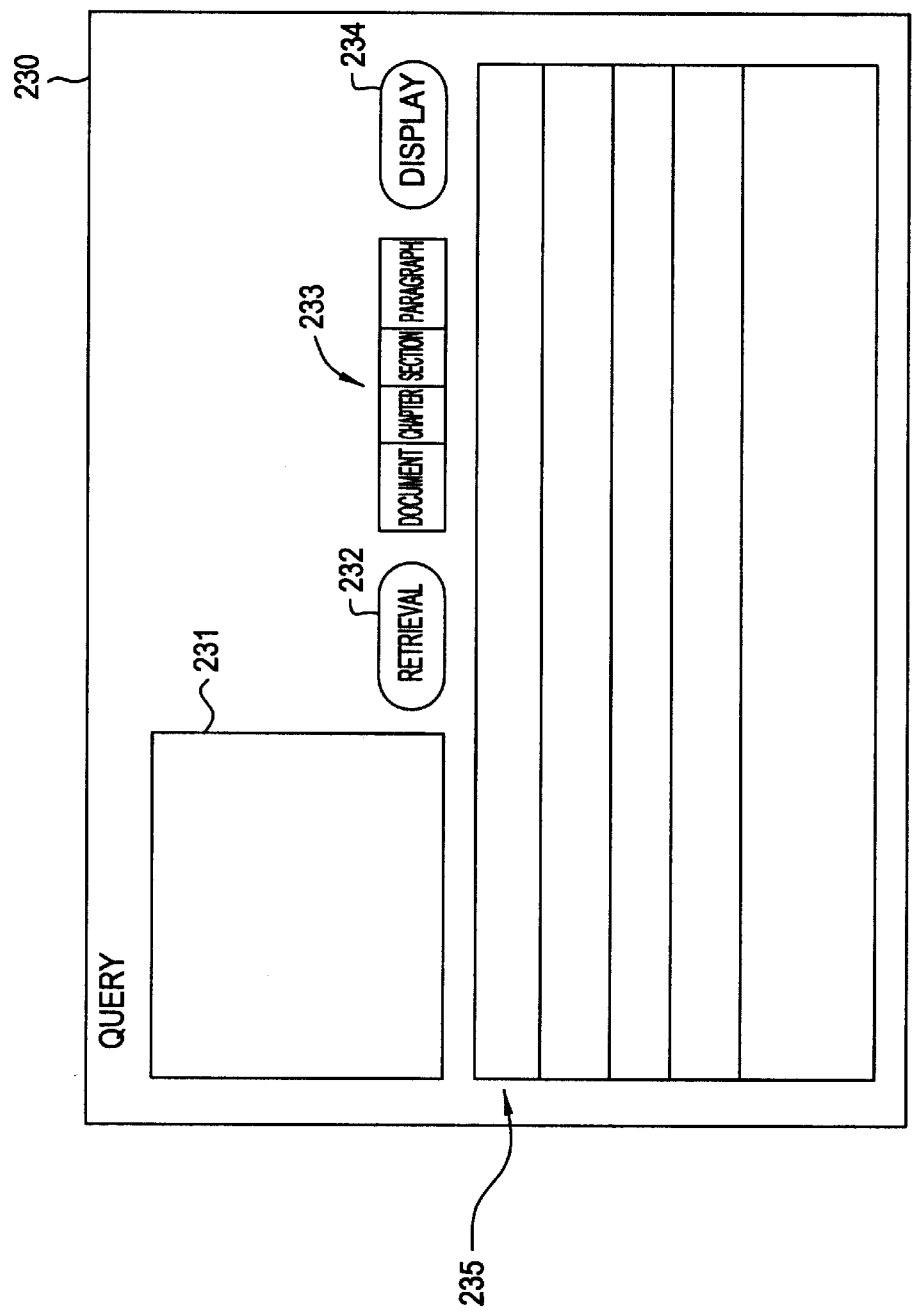
FIG. 18 illustrates an example of an input output screen relating to the third embodiment of a document retrieval device of the present invention.

FIG. 18 illustrates an example of an input/output screen relating to the third embodiment of a document retrieval device of the present invention.

Input/output screen 230 comprises a query input column 231 that receives query input, a retrieval button 232 that indicates the retrieval start, a range selection button 233 that performs the selection of the display range when the extraction display is performed of the selected element, a display button 234 that indicates the extraction display of the selected element, and retrieval results display column 235 that displays the retrieval results.

The query input column 231 corresponds to query input section 28. Additionally, retrieval button 232 corresponds to the retrieval section 30, range selection button 233 corresponds to display range selection section 32b, display button 234 corresponds to display element extraction section 32c, and retrieval result display column 235 corresponds to display section 31 respectively.

Next, where document retrieval is performed by the third embodiment of a document retrieval device of the present invention, an explanation is provided with an example following the flowchart of FIG. 16 of how the processing is performed.

FIG. 19 illustrates an example of a document that is stored in document storing section 21.

Document 120 is a document that has the title of "technological advancement in information retrieval". The entire body of the document contains multiple "chapters", the heading of Chapter 1 is "background", the heading of chapter 2 is "vector space model", the heading of chapter 3 is "usage of natural language processing", and the heading of chapter 4 is "user interface". Some chapters contain multiple "sections". The heading of chapter 3 section 1 is "thesaurus", and the heading of chapter 3 section 2 is "document structure analysis". The chapters and sections further contain multiple paragraphs. Paragraph P21 of chapter 1 has content that is shown by the key words (internet, information, access), and paragraph P22 has content that is shown by the key words (multimedia, text, retrieval). Also, paragraph P23 of Chapter 2 has content that is shown by the key words (section, verification, retrieval), paragraph P24 has content that is shown by the key words (word, emphasis, vector), and paragraph P25 has content that is shown by the key words (frequency, dispersion, similarity). Moreover, paragraph P26 of Chapter 3 section 1 has content that is shown by the key words (vocabulary, dictionary, retrieval), paragraph P27 of chapter 3 section 2 has content that is shown by the key words (context, text, concept, retrieval), paragraph P28 has content that is shown by the key words (sentence, meaning, role, retrieval), and paragraph P29 has content that is shown by the key words (retrieval, accuracy, statistics, information). Also, paragraph P30 of chapter 4 has content that is shown by the key words (user, interaction, browsing).

When document retrieval is performed to documents that includes this type of document 120, composite vectors are generated for each structural element of all of the retrieval units following the processing according to the flowchart illustrated in FIG. 16.

"Paragraphs" are first designated as the retrieval units. A query is input at query input column 231 at input output screen 230, illustrated in FIG. 18 where "information retrieval that uses natural language processing" is input, for example, and retrieval button 232 is selected with a pointing device of a mouse or the like (step S41 of FIG. 17).

Upon doing this, query vector generation section 29 extracts key words from the query that was input, and query vectors are generated (step S42 of FIG. 17). Retrieval section 30 reads in query vector that was generated by query vector generation section 29 and reads in composite vectors that were maintained in composite vector maintenance section 27 (step S43 of FIG. 17). From this, the read-in query vector is compared with the composite vectors (step S44 of FIG. 17).

FIG. 20 is a table that illustrates the state of the comparison of the composite vectors and query vector for each paragraph of document 120 illustrated in FIG. 19.

The degree of similarity of the query vector and composite vectors are calculated from the total counts of the matched key words and weighted by the third embodiment, and table 121 is generated. According to Table 121, paragraph P29 which has "information" and "retrieval" as key words, and "natural", "language", "processing", "usage" as the heading of the chapter that is the upper element (chapter 3), and "information" and "retrieval" as the title of the document which is the upper element, has the highest degree of similarity with the query "information retrieval that uses the natural language processing". Also, the three paragraphs P26, P27, P28 have the second highest degree of similarity.

Retrieval section 30 that calculates the degree of similarity in this way displays the retrieval units in the retrieval results display column 235 in the order from a high degree of similarity (step S45 of FIG. 17).

Figure 21:
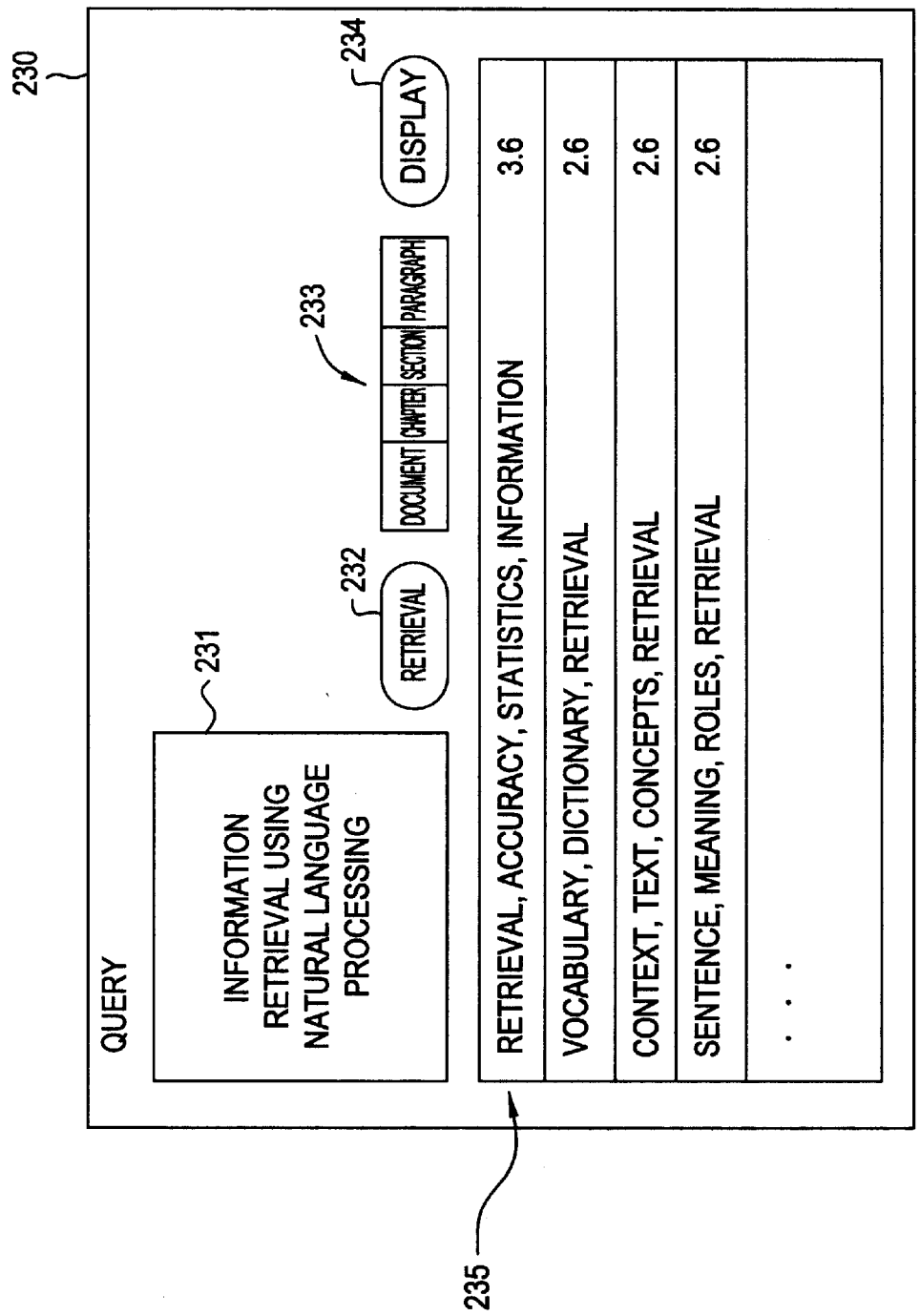
FIG. 21 illustrates an example of an input output screen that displays the retrieval results.

FIG. 21 illustrates an example of an input/output screen where the retrieved results are displayed.

In the FIG. 21, query "information retrieval using natural language processing" is input to query input column 231. In the retrieval results display column 235, the degree of similarity and the information that specifies the structural elements of the retrieval units at a glance (for example, key words) are displayed in descending order by degree of similarity. It is acceptable to display character string of only fixed lengths from the front of the element to specify the structural elements, as other methods that use key words that are shown here as information that specifies the structural elements of the retrieval units at a glance. Also, the more documents are retrieved, the retrieval results become greater, and because of this, a constant degree of similarity is established as the threshold value when there is practical use, and structural elements of retrieval units of a degree of similarity below the threshold value are made so as to not be displayed.

In this manner, the extraction display can be performed from the retrieved results. The element that is desired to be extracted and displayed (retrieval units) are selected by means of the pointing device like a mouse from retrieval results display column 235 (step S47 of FIG. 17), and an arbitrary display range is selected from range selection button 233 similarly (step S48 of FIG. 17), and when display button 234 is selected, the element is extracted from document storing section 21 by means of display element extraction section 32c of document extraction section 32 (step S49 of FIG. 17), and displayed on display section 31 (step S50 of FIG. 17). This extraction display is exactly the same as the extraction display performed by the first embodiment.

Additionally, the stored documents are partitioned by arbitrary retrieval units by the third embodiment of a document retrieval device of the present invention, and the degree of similarity of the composite vectors that are generated corresponding to the key words that were included in the structural elements of each retrieval unit and the query vectors that are generated with correspondence to the key words that are included in the queries are calculated, and displayed in order according to the highest degrees of similarity. After this, because detailed content can be displayed according to their importance, it is possible to simply extract just the necessary topics from large quantities of documents or huge documents of the like.

Furthermore, the contents of each retrieval unit of the document and the headings of the structural elements that are arranged in a higher level than these retrieval units are shown with the key words by means of the document retrieval device of the present invention, and the structural elements are retrieved based on the degree of similarity of the composite vectors that were generated from these key words and the query vector that was generated from the query. Therefore, structural elements along with their headings that include identical key words with the query can be retrieved with a high probability.

Figure 22:
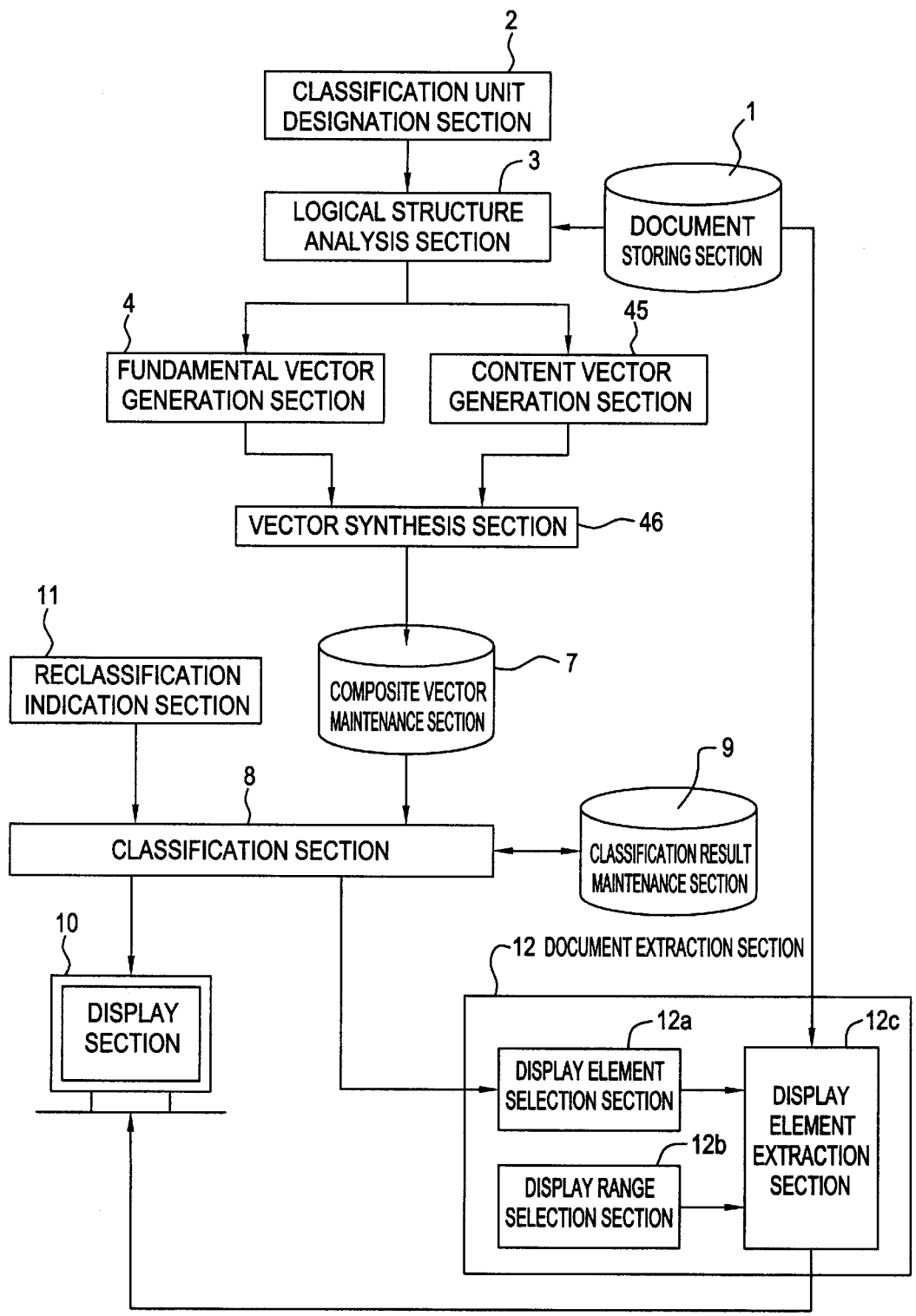
FIG. 22 illustrates the fundamental construction of the fourth embodiment of a document retrieval device of the present invention.

FIG. 22 illustrates the fundamental structure of the fourth embodiment of a document retrieval device of the present invention. Furthermore, the structure of the fourth embodiment of a document retrieval device of the present invention is fundamentally the same as the structure of the first embodiment. Consequently, the same symbols are attached to the same components, and the detailed explanation is abbreviated.

The fourth embodiment of a document retrieval device is structured from the document storing section 1, classification unit designation section 2, logical structure analysis section 3, fundamental vector generation section 4, content vector generation section 45, vector synthesis section 46, composite vector maintenance section 7, classification section 8, classification results maintenance section 9, display section 10, reclassification indication section 11, and the document extraction section 12.

Content vector generation section 45 extracts key words from the contents of the structural elements other than the structural elements of the classification units from which the fundamental vectors are generated by means of the fundamental vector generation section 4 in the logical structure of the document that was analyzed with logical structure analysis section 3, and the content vectors are generated.

Vector synthesis section 46 synthesizes the fundamental vector that was generated with fundamental vector generation section 4 and the content vector that was generated with content vector generation section 45, and generates the composite vectors. The processing of vector synthesis section 46 is fundamentally the same as the processing of vector synthesis section 6 of the first embodiment.

The order of the document retrieval in the document retrieval device of this sort of structure is approximately the same as the order of the document retrieval in the first embodiment, and processing is performed following the flowcharts illustrated in FIGS. 2–3. However, in place of the generation of the heading vectors of step S5 illustrated in FIG. 2, the generation of content vectors is performed. Below, an explanation is given with reference to the generation of these content vectors.

Figure 23:
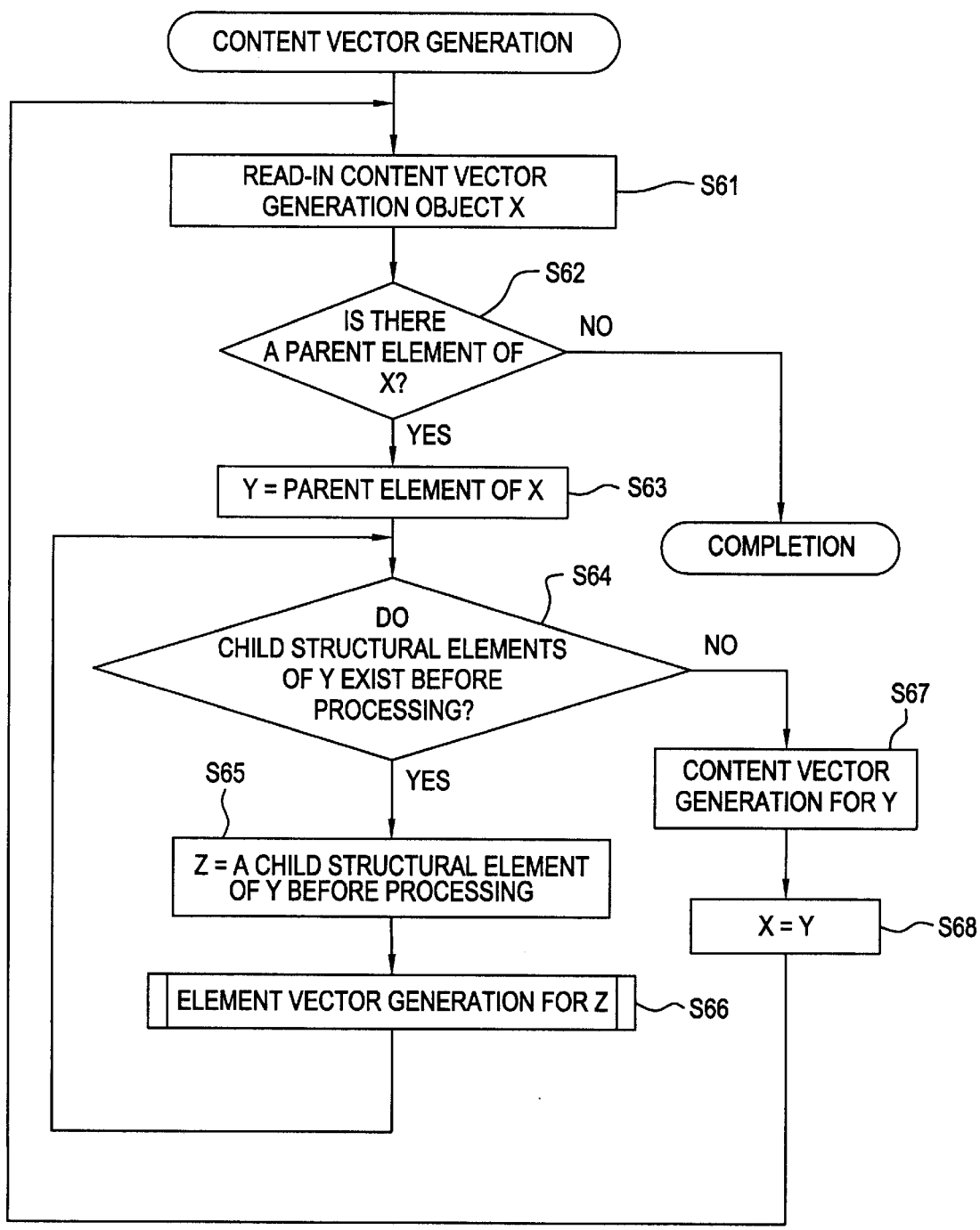
FIG. 23 is a flowchart illustrating the order of generating the content vectors during document retrieval in the fourth embodiment of a document retrieval device.

FIG. 23 is a flowchart that illustrates the order of generation of content vectors in the document retrieval in the fourth embodiment of the document retrieval device.

Content vector generation section 45 first reads a structural element of classification unit from which the fundamental vector is generated by fundamental vector generation section 4 as "X" (step S61). Next, a determination is made whether or not there is a structural element which is the parent of "X" (step S62). If there is no structural element which is the parent of "X", the processing is complete. Also, if a structural element which is the parent of "X" exist, this structural element is read as "Y" (step S63). From this, a determination is made whether or not "Y" has child structural elements that are yet to be processed by vector generation (step S64). Here, vector generation is meant to be both the generation of the fundamental vectors and the element vectors (multiple vectors that are generated in order to structure the content vectors are called element vectors).

Also, if a child structural elements exists that is yet to be processed by the vector generation, this structural element is read in as "Z" (step S65), and an element vector is generated from "Z" (step S66). Furthermore, a detailed explanation will be given later concerning the order of the element vector generation from "Z".

When element vector generation from "Z" is completed, the process proceeds again to step S64. In step S64, if child structural elements which are yet to be processed by the vector generation are determined not to be present in "Y", element vectors generated by the processing of steps S64–66 are synthesized as content vectors of "Y" (step S67). Since the content vector generation relative to the structural element "Y" is completed, "Y" is made to be "X" (step S68), and the process proceeds again to step S61.

An explanation is provided hereafter relative to the order of the element vector generation in step S66 of this flowchart.

Figure 24:
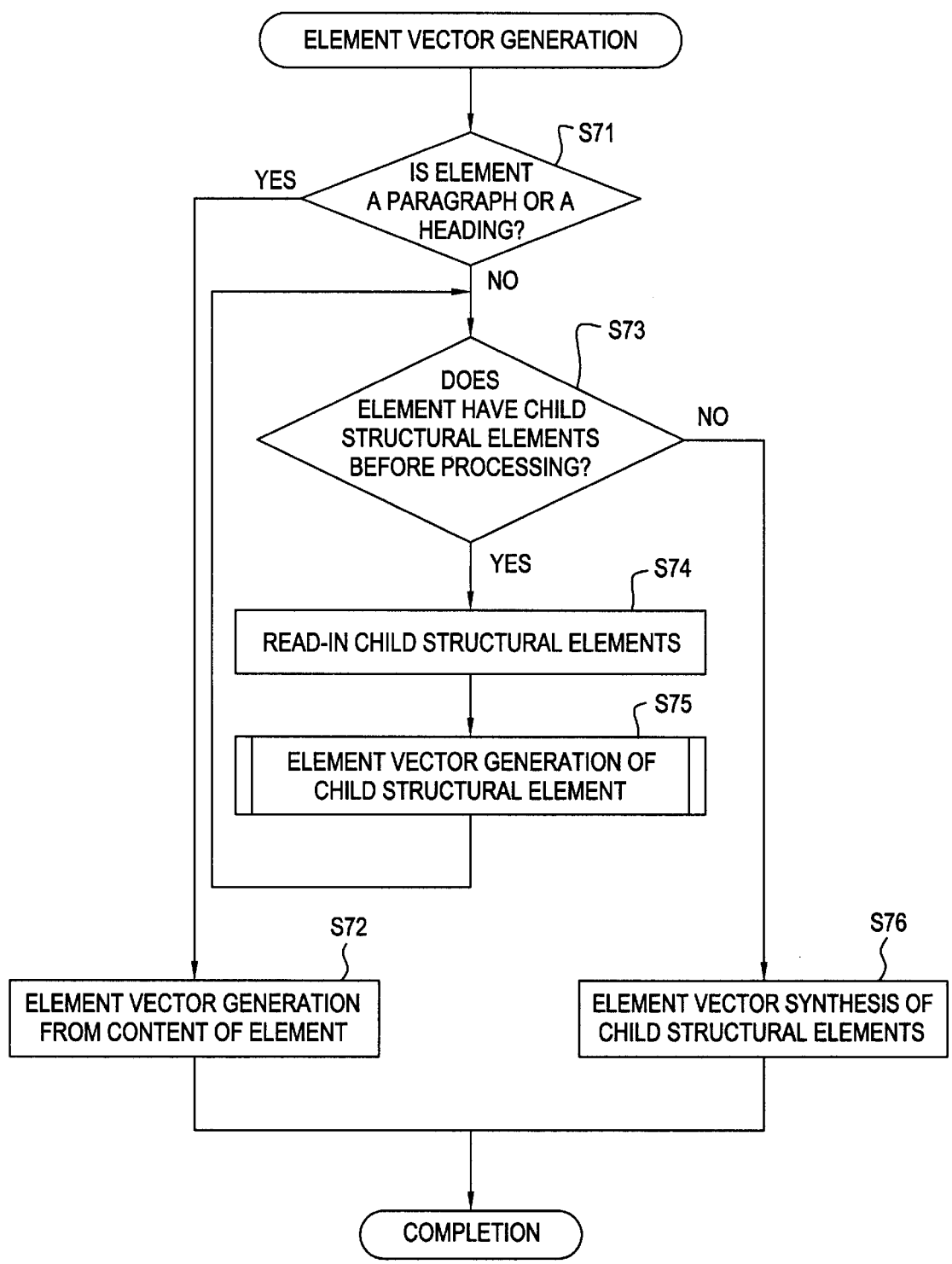
FIG. 24 is a flowchart illustrating the order that the element vectors were generated in order to generate the content vectors during the document retrieval in the fourth embodiment of a document retrieval device.

FIG. 24 is a flowchart that illustrates the order of the generation of the element vectors in order to generate the content vectors in the document retrieval in the fourth embodiment of the document retrieval device.

Content vector generation section 45 first judges whether the element that is made the object of element vector generation is a heading, a paragraph, or other type (step S71). When the element that is made the object of element vector generation is either a heading or a paragraph, key words are extracted from the content of the element, and an element vector is generated (step S72), and the processing becomes completed. Also, in the determination of step S71, when the element which is made the object of the element vector generation is neither a heading, nor a paragraph, a determination is made whether or not the element has child structural elements that are yet to be processed by the vector generation (step S73).

Here, the vector generation discussed is meant to be both the fundamental vector generation and the element vector generation.

If there remain child structural elements that are yet to be processed by the vector generation, a child structural element is read-in (step S74). Also, element vector generation is performed for the read-in child structural element (step S75), or, in other words, the process from step 71 to completion shown in this flowchart is recursively called.

When the generation of element vectors of the child structural elements is completed, the process proceeds again to step S73. In step S73, where there is the determination that the child structural elements that are yet to be processed by the vector generation do not exist, element vectors are synthesized which are generated by the processing of steps S73–S75 (step S76), and the processing shown in this flowchart becomes completed.

Where document retrieval is performed by the fourth embodiment of a document retrieval device of the present invention, an explanation is given relative to an example of document 120 illustrated in FIG. 19 of what kind of processing is performed following the flowcharts of FIGS. 2, 3, 23 and 24.

Retrieval units are to be made "paragraphs" with classification unit designation section 2 (step S1 of FIG. 2), and when document 120 illustrated in FIG. 19 is read-in as the retrieval object at logical structure analysis section 3, (step S2 of FIG. 2), the logical structure of document 120 is analyzed, and expressed as a tree arrangement (step S3 of FIG. 2).

Figure 25:
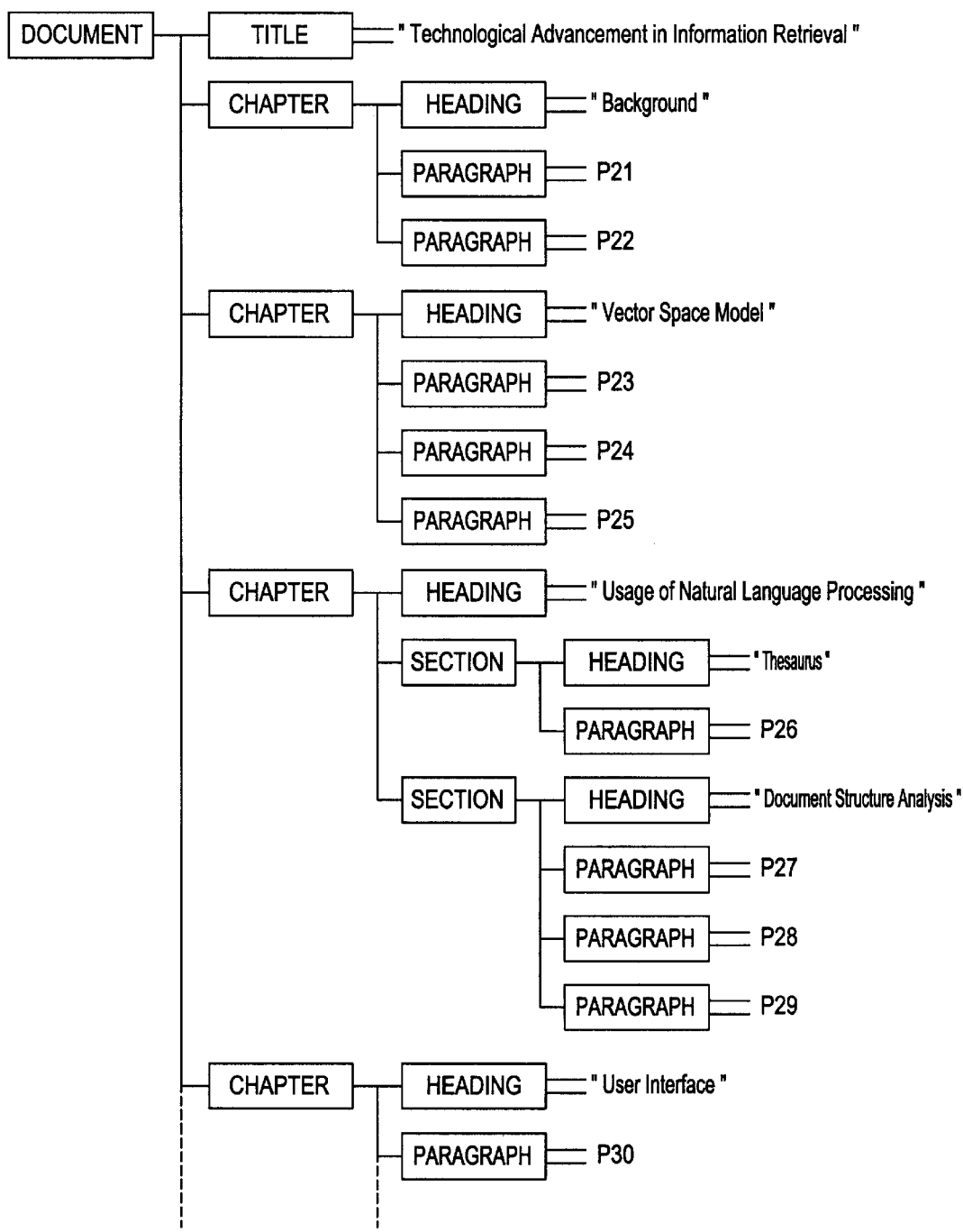
FIG. 25 illustrates the logical structure of a document illustrated in FIG. 19 having a tree arrangement.

FIG. 25 illustrates the logical structure of the document shown in FIG. 19 with the tree arrangement.

Fundamental vector generation section 4 reads in document 120 at each "paragraph" that comprises a retrieval unit and extracts the key words from the contents of each "paragraph". Here, the method of extraction of key words uses prior art, and is not limited to particular methods.

Next, fundamental vector generation section 4 performs the calculations that are shown by equation (1) and generate the fundamental vectors of t dimensions relative to each "paragraph" based on k key words that are extracted (step S4 of FIG. 2). Thus, dimension number t comprises the total number of the key words that are used in classification. The calculation method of this dimension number t differs by means of the extraction method of the key words, and in the case where the word list is used in the extraction of the key words, the total number of the words that are included in this word list becomes t.

Content vector generation section 45 reads in all of the structural elements that are in the upper level of each "paragraph" from all the logical structure elements retrieved in logical structure analysis section 3. Also, the content vector of t dimensions relating to each structural element is generated.

For example, fundamental vector $F_{p28}$ is generated with paragraph P28 of Chapter 3 Section 2 of Document 120 by fundamental vector generation section 4. The following is an explanation of the flowcharts of FIGS. 23–24 on what manner the content vector is generated corresponding to the fundamental vector $F_{p28}$.

Content vector generation section 45 reads in paragraph P28 of chapter 3 section 2 of document 120 as object "X" of the content vector generation (step S61 of FIG. 23). A determination is made from the tree arrangement illustrated in FIG. 25 whether or not the parent element of "X" exists (step S62 of FIG. 23), and the answer is yes, since a "section" exists. Section 2 of Chapter 3 of this document 120 is made to be "Y" (step S63 of FIG. 23). Upon determining whether or not the child structural elements before the processing exist at "Y" (step S64 of FIG. 23), and the answer is yes, since a "heading" exist first. In this instance, the "heading" of Chapter 3 section 2 of this document 120 are made to be "Z" (step S65 of FIG. 23), and an element vector of "Z" is generated. In generating the element vector of "Z", when a determination is made whether this element is a paragraph or a heading (step S71 of FIG. 24), "Z" is a "heading". Therefore, key words are extracted from the content of the element "Z" or, in other words, the character string "document structure analysis", and element vector $G_1$ is generated (step S72 of FIG. 24). Furthermore, in the generation of element vectors that appear quite frequently hereafter, equation (1) that is the generation equation of the fundamental vectors is appropriate.

When determining whether or not the child structural elements of "Y" which are yet to be processed exist, (step S64 of FIG. 23), "paragraph P27" exists. By this means, "paragraph P27 of Chapter 3 section 2 of this document 120 is newly made to be "Z" (step S65 of FIG. 23), and the element vector of "Z" is generated. In generating the element vector of "Z", when there is a determination whether the element "Z" is a paragraph or a heading (step S71 of FIG. 24), "Z" is a "paragraph". Therefore, key words (context, text, concept, retrieval) are extracted from the element "Z" and element vector $G_2$ is generated (step S72 of FIG. 24).

Similarly, element vector $G_3$ is also generated relative to "paragraph P29 of Chapter 3 section 2 of document 120. Furthermore, "paragraph P28" of Chapter 3 Section 2 of document 120 has already been made the object of the fundamental vector generation, so it is separated from the object of element vector generation. When the element vector generation relating to "paragraph P29" is completed, a determination is reached that child structural elements which are yet to be processed do not exist in "Y" any more (step S64 of FIG. 23). By this means, element vectors $G_1$–$G_3$ that were generated up to the present are synthesized, and content vector $G_{p28}$ is generated in relation to "Y" (Chapter 3 Section 2 of document 120) (step S67 of FIG. 23). Also, since the generation of content vector $G_{p28}$ was completed, "Y" is defined as a new content vector generation object "X" (step S68 of FIG. 23).

Content vector generation section 45 reads in section 2 of chapter 3 of document 120 as "X" for content vector generation (step S61 of FIG. 23). When a determination is made whether or not a parent element of "X" exists from the tree arrangement illustrated in FIG. 25 (step S62 of FIG. 23), a "Chapter" exist. In this instance, Chapter 3 of this document 120 is made to be "Y" (step S63 of FIG. 23). When there is judgment on whether or not the child elements of "Y" which are yet to be processed exist (step S64 of FIG. 23), a "heading" exist first. By this means, the heading of Chapter 3 of this document 120 are made to be "Z" (step S65 of FIG. 23), and element vector of "Z" is generated. In generating the element vector of "Z", when a determination is made whether or not the element "Z" is a paragraph or a heading (step S71 of FIG. 24), "Z" is a "heading". Therefore, key words are extracted from the content of the element "Z" or in other words the character string "usage of natural language processing", and element vector $H_1$ is generated (step S72 of FIG. 24).

When a determination is made whether or not child structural elements of "Y" which are yet to be processed exist (step S64 of FIG. 23), "section 1" exists. By this means, "section 1" of Chapter 3 of this document 120 is made a new "Z" (step S65 of FIG. 23), and an element vector of "Z" is generated. In generating the element vector of "Z", when a determination is made whether or not the element "Z" is a paragraph or a heading (step S71 of FIG. 24), "Z" is neither a heading nor a paragraph. Also, when a determination is made whether or not the element "Z" has child structural elements yet to be processed (step S73 of FIG. 24), a "heading" exist first.

In this example, the "heading" of chapter 3 section 1 of this document 120 are read (step S74 of FIG. 24) and an element vector relating to the element is generated (step S75 of FIG. 24). In other words, a determination is made whether or not the element is a paragraph or a heading (step S71 of FIG. 24), and since it is a "heading", key words are extracted from the character string "thesaurus" that comprise the content of the element, and element vector $H_{21}$ is generated (step S72 of FIG. 24).

When a determination is made whether or not "Z" has child structural elements yet to be processed once again (step S73 of FIG. 24), "paragraph P26" exists. In this example, "paragraph P26" of Chapter 3 section 1 of this document 120 is read (step S74 of FIG. 24), and an element vector is generated in relation to the element (step S75 of FIG. 24). In other words, a determination is made whether or not the element is a paragraph or a heading (step S71 of FIG. 24), and since it is a "paragraph", key words (vocabulary, dictionary, retrieval) are extracted from the element, and element vector $H_{22}$ is generated (step S72 of FIG. 24).

When a determination is made whether or not "Z" holds child structural elements yet to be processed once again (step S73 of FIG. 24), since child structural elements yet to be processed do not exist now, element vectors $H_{21}$ and $H_{22}$ that were generated up to the present are synthesized, and element vector $H_2$ of element "Z" (chapter 3 section 1 of document 120) is generated (step S76 of FIG. 24).

When determining whether or not child structural elements of "Y" which are yet to be processed exist once again (step S64 of FIG. 23), child structural elements yet to be processed do not exist now. Therefore, element vectors $H_1$ and $H_2$ that were generated up to the present are synthesized, and content vector $H_{P28}$ is generated relative to "Y" (chapter 3 of document 120) (step S67 of FIG. 23). Also, since the completion of the generation of content vector $H_{P28}$ is finished, "Y" is defined as the new content vector generation object "X" (step S68 of FIG. 23).

Content vector generation section 45 reads in chapter 3 of document 120 as the content vector generation object "X" (step S61 of FIG. 23). When a determination is made whether or not a parent element of "X" exist from the tree arrangement illustrated in FIG. 25 (step S62 of FIG. 23), a "document" exists. Thus, document 120 is made to be "Y" (step S63 of FIG. 23), and content vector $J_{P28}$ is generated relative to "document 120". When a "document" is defined as new content vector generation object "X" (step S68 of FIG. 23), there is no parent element of "X". Consequently, this content vector generation processing is finished.

Up until now, in relation to "paragraph P28" that is a structural element of classification unit and was made the object of fundamental vector $F_{P28}$ generation, content vector $G_{P28}$ of "chapter 3 section 2 of document 210", content vector $H_{P28}$ of "Chapter 3 of document 120", and content vector of $J_{P28}$ of "document 120", are generated.

Continuing the explanation by returning to the flowchart of the document retrieval of FIG. 2, the fundamental vector and content vectors are synthesized which were generated up to the present by means of vector synthesis section 46 (step S6 of FIG. 2). In this example, composite vector T relative to a paragraph that is below a certain section that is below a certain chapter in a document is shown by equation (18).

$$T = F + w_1 G + w_2 H + w_3 J \ldots \quad (18)$$

In equation (18), F is the fundamental vector, G is the content vector of a section, H is a content vector of a chapter, and J is a content vector of the document. Also, $w_1$, $w_2$, and $w_3$ are the weights that are calculated with equation (12). In this manner, retrieval where weight is placed more at the lower level is suited for the case where the demands of the retriever are concrete.

When fundamental vector $F_{P28}$, and content vectors $G_{P28}$, $H_{P28}$, and $J_{P28}$ are adapted to equation (18), composite vector $T_{P28}$ can be shown by equation (19).

$$T_{P28} = F_{P28} + w_1 G_{P28} + w_2 H_{P28} + w_3 J_{P28} \quad (19)$$

Furthermore, in content vectors G, H, and J, the arbitrary value $w_c$ or the like that is greater than zero and less than or equal to one is multiplied and emphasis can be further added.

In this manner, when the composite vectors are generated relative to the structural elements of the classification units, composite vector maintenance section 7 attaches the corresponding composite vector to the structural elements of the classification units and maintains the attached objects (step S7 of FIG. 2). If documents that should be the objects of retrieval still remain in document storing section 1, a similar processing is performed once again, that is, the process proceeds to step S2 from step S8 of FIG. 2. The example continues where only document 120, illustrated in FIG. 19, is the object of retrieval.

When the generation and maintenance of composite vectors relative to the structural elements of all the classification units of the documents are completed, classification section 8 reads all of the composite vectors that are maintained at composite vector maintenance section 7 (step S9 of FIG. 2). Also, classification section 8 classifies all of the documents into one or more categories for each classification unit based on the degree of similarity among the read-in composite vectors, and displays them (step S10 of FIG. 2). In this example, the classification of the documents and the display of the results are processed along the flowchart illustrated in FIG. 3, similar to the first embodiment.

As explained above, the stored documents are partitioned by arbitrary classification units by the fourth embodiment of a document retrieval device of the present invention, and at this time, relative to the consideration that is also taken for the content of the structural elements that were positioned in the upper level of the structural elements of the classification units, the structural elements which have a high degree of similarity tend to be classified into the same category, and only the structural elements of the classification units that include the necessary topics can be obtained from the generated categories.

Detailed content can be displayed as needed, and it is possible to simply extract only the necessary topics from the large volume documents and huge documents.

Furthermore, by means of the fourth embodiment, the element vectors of "headings" and the element vectors of "paragraphs" are made to be equally weighted when content vectors are synthesized, and it is acceptable to change the weighting to the element vectors of "headings" and the weighting to the element vectors of "paragraphs" by means of the purpose of retrieval and the state of the document and the like. For example, if weighting to the element vectors of "headings" is made heavier than the weighting to the element vectors of the "paragraphs", document retrieval becomes possible where greater importance is attached to the contents of "headings" than to the contents of "paragraphs".

Also, when element vectors relating to "headings" or "paragraphs" are generated, the degree of similarity with the fundamental vectors that were previously generated is calculated, and it is acceptable to make the weighting heavier to the element vectors that have the high degree of similarity with the fundamental vectors. For example, as known in prior art, when the cosine coefficient is used, the degree of similarity sim(P, Q) (0<sim(P,Q)<1) between t dimension vectors $P=(p_1, \ldots, p_t)$ and $Q=(q_1, \ldots, q_t)$ can be calculated with equation (20).

$$sim(P, Q) = \frac{\sum_{i=1}^{T} p_i q_i}{\sqrt{\sum_{i=1}^{t} p_i^2} \sqrt{\sum_{i=1}^{t} q_i^2}} \quad (20)$$

If this degree of similarity sim(P,Q) is used with weighting, the accuracy of the document retrieval increases because the classification is performed with more emphasis on the contents of the structural elements which are the classification units.

In this manner, the contents of the structural elements of each classification unit of the document, and the contents of all the structural elements other than those classification units are expressed as the key words by the document retrieval device of the present invention, and the structural elements of the documents are classified based on the degrees of similarity of the vectors that were generated from these key words. Therefore, structural elements with the other associated structural elements having a high degree of similarity and mutual relevance can be retrieved and displayed.

By means of the fifth embodiment of the document retrieval device of the present invention, document retrieval is performed wherein documents that did not have hierarchical logical structure explicitly are the target of retrieval with the document retrieval device of the fourth embodiment. The device construction of the present embodiment is the same as the device construction of the fourth embodiment illustrated in FIG. 22. Also, document retrieval processing is expressed with the processing order that is similar to the flowchart illustrated in FIGS. 2–3. However, instead of the generation of the heading vectors of step S5 illustrated in FIG. 2, the generation of content vectors is performed. The following is an explanation of the generation of these content vectors.

Figure 26:
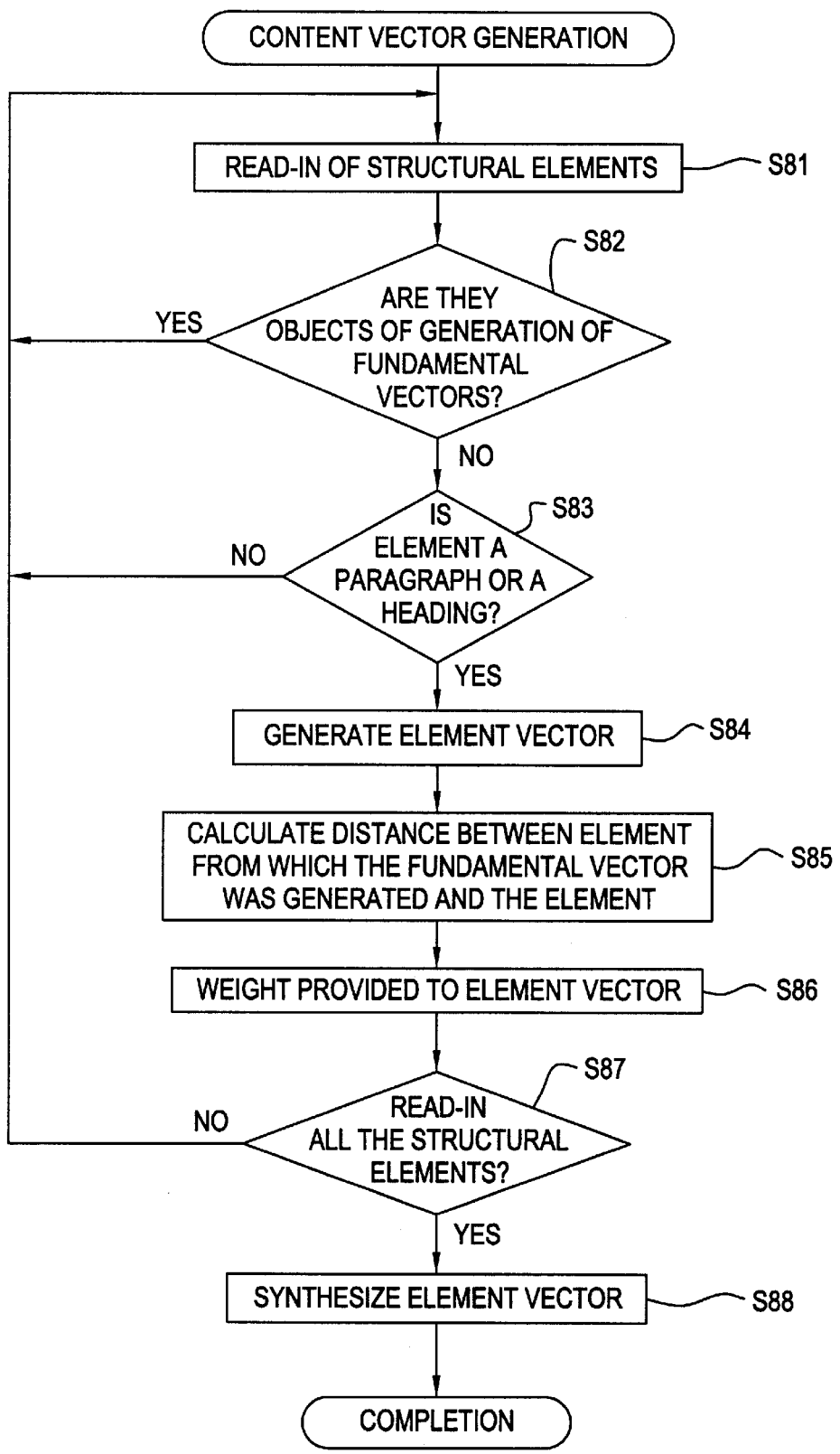
FIG. 26 is a flowchart illustrating the order when the content vectors were generated during the document retrieval in the fifth embodiment of a document retrieval device.

FIG. 26 is a flowchart that illustrates the generation of content vectors in the document retrieval in the fifth embodiment of a document retrieval device.

Content vector generation section 45 first reads in one of the structural elements from the logical structure of documents that were analyzed with logical structure analysis section 3 (step S81). Next, a determination is made whether or not the read-in structural element comprises a structural element that is made to be the object of the generation of fundamental vector by means of step S4 of FIG. 2 (step S82). If the read-in structural element is a structural element that is made to be the object of the generation of fundamental vector in step S5 of FIG. 2, processing is not performed relative to this structural element, and the program proceeds to step S81 for reading in the next structural element. When the structural element that was read-in in step S81 is not a structural element that was made to be the object of the generation of fundamental vector, a determination is made whether or not this structural element is a paragraph or a heading (step S83).

Where the structural element is neither a paragraph nor a heading, processing in relation to the structural element is not performed, and the program proceeds to step S81 once again in order to read-in the next structural element. When the structural element that was read-in in step S81 is a paragraph or a heading, an element vector is generated relative to this structural element (step S84). Next, the distance between the structural element that was to be made the objects of the generation of the fundamental vector in step S4 of FIG. 2 and the structural element that generated the element vector in step S84 is calculated (step S85).

In this example, the distance between the structural elements is calculated based on the tree structure obtained from the results of the analysis of the logical structure in step S3 of FIG. 2. The figure is shown for an explanation of how to calculate the distance.

Figure 27:
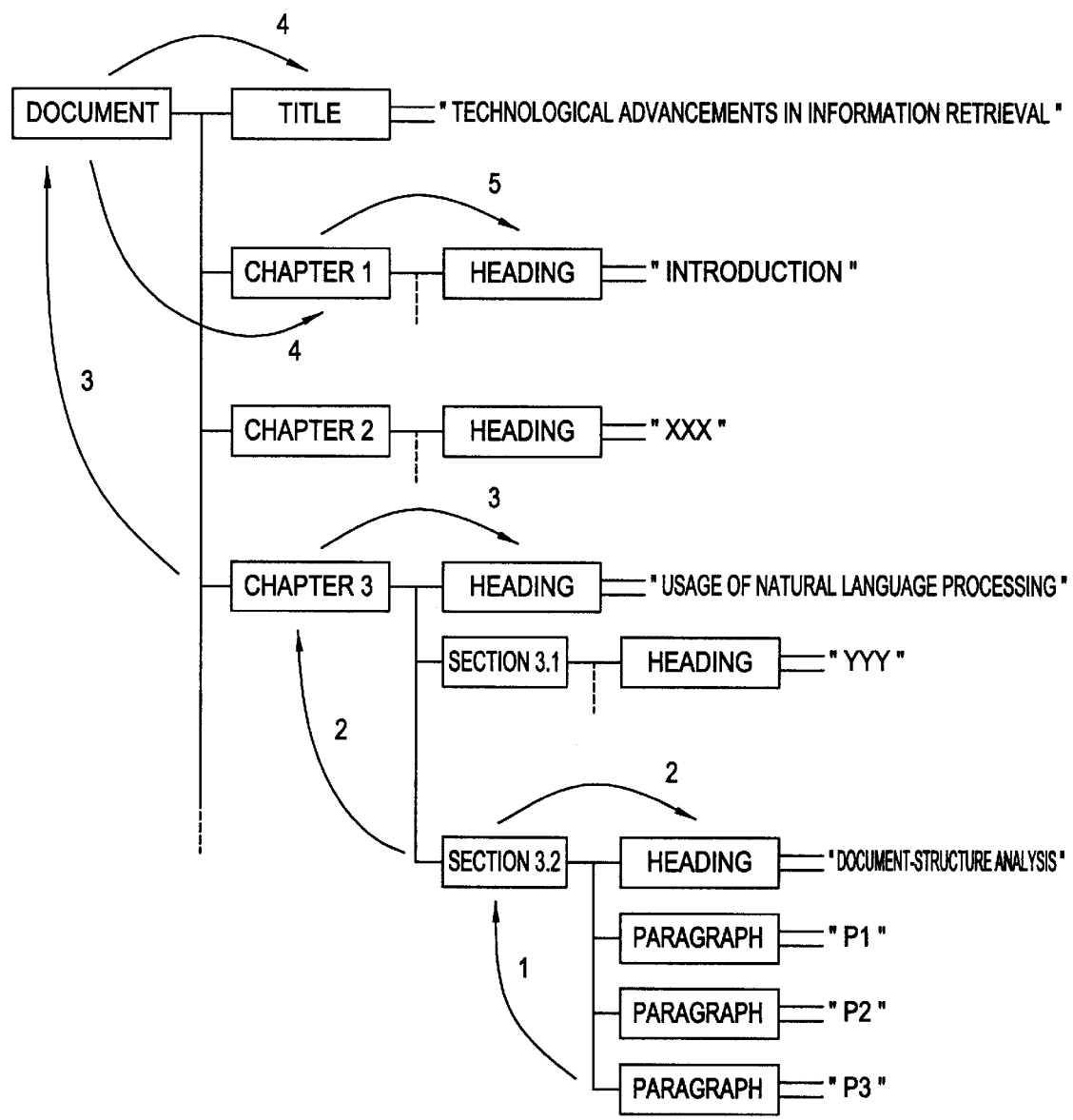
FIG. 27 illustrates the logical structure of the document illustrated in FIG. 31 having a tree arrangement, and illustrates the distance between the structural elements.

FIG. 27 expresses the logical structure of a document having a tree structure shown in FIG. 31, and illustrates the distance between the structural elements. In the tree structure, the number of edges which are passed through when pursuing from a certain node to the objective node is defined as the distance between the nodes. When the distance between the structural elements is defined as the distance between the nodes relative to the tree structure, the distance between paragraph P2 and the "heading" of section 3.2 in this FIG. 27 is 2. Also, the distance between paragraph P2 and the "heading" of the chapter 3 becomes 3, and the distance between paragraph P2 and the "tile" of the document becomes 4. Furthermore, the distance between paragraph P2 and the "heading" of the chapter 1 becomes 5.

Returning to the flowchart of FIG. 26, when the distance between the structural elements is calculated in step S85, weighting is provided relative to the element vectors that were generated in step S84 based on that distance (step S86). Detailed explanation concerning the methods of weighting will be given later with an example. Lastly, a determination is made whether or not all the structural elements were read-in (step S87), and if there are structural elements that were still not read-in, the program returns to step S81, and the program proceeds to the processing relative to the following structural elements. Also, if all of the structural elements are read-in, all of the element vectors are synthesized that are generated up to the present, and content vectors are generated (in step S88), and the processing is completed.

In this example, where document retrieval is performed with the fifth embodiment of the present invention, an example is given, and the explanation follows the flowcharts of FIGS. 2, 3, and 26 on just how the classification and retrieval is performed.

HTML documents that are disclosed on the WWW can be made the objects of classification and are stored in document storing section 1. By means of the present embodiment, documents such as illustrated in FIG. 12 and explained by the second embodiment of the present invention are used as examples of HTML documents stored in the document storing section 1.

Classification units are made "paragraphs" by the classification unit designation section 2 (step S1 of FIG. 2), and when the documents such as illustrated in FIG. 12 are read-in to logical structure analysis section 3 (step S2 of FIG. 2), the logical structure of the documents is analyzed, and the title element (TITLE), the heading elements (H2 and H3), and the paragraph elements (P) are retrieved, and expressed as a tree structure (step S3 of FIG. 2).

Fundamental vector generation section 4 reads in the documents such as illustrated in FIG. 12 for each "paragraph" that comprises a classification unit, and extracts the keywords from the content of each "paragraph". As for the extraction method of the key words, well known prior art can be used, and is not especially limited by one method. Next, fundamental vector generation section 4 performs the calculations shown in equation (1), and the fundamental vectors of t dimensions relative to each paragraph are generated (step S4 of FIG. 2).

Furthermore, weighting is provided according to the degree of dispersion and appearance frequency of the word k at the values of $P_{ik}$ in equation (1) by the fifth embodiment, and normalization is performed so that the norm of the fundamental vector becomes 1. The influence due to the differences of the text amount of every structural element can be eliminated by means of normalization so that the norms of the fundamental vectors become 1.

Concerning the methods for weighting according to the degree of dispersion and the appearance frequency of the words, and the method for normalization so that the norms of the fundamental vectors become 1, methods are given that are the same as the methods that were explained in the second embodiment of the present invention.

A fundamental vector is generated, for example, from "paragraph P18" of chapter 2 section 3 of document 100 illustrated in FIG. 12, (NIST, recent, produce, computer, security, handbook, . . . ) are first extracted as key words from "paragraph P18" by fundamental vector generation section 4, and the term frequency (TF) and the inverse document frequency (IDF) of each key word are calculated, and fundamental vector $L_{P18}$ is generated and normalized so that the norm of the vector becomes 1.

Content vector generation section 45 first reads in "title" from all the logical structural elements retrieved from the logical structure analysis section 3 (step S81). When a determination is made whether or not the structural element is the target of the generation of the fundamental vector (step S82), since "paragraph P18" is the target of the generation of the fundamental vector, "title" is not a target of the generation of fundamental vector.

Next, when a determination is made whether or not the structural element is a paragraph or a heading (step S83), "title" is a heading of the top level. Therefore, key words are extracted from "title", and element vector $M_1$ is generated. Furthermore, the generation method of element vectors that appear quite frequently hereafter is the same as the generation methods of fundamental vectors.

In this example, when the distance of "paragraph P18" that was the target of the generation of the fundamental vector, and "title" that generated the element vector is calculated by means of the tree structure illustrated in FIG. 13 (step S85), the distance between the structural elements is 4. When the distance between the structural elements is calculated, weighting is provided relative to element vector $M_1$ of "title" (step S86).

By means of the fifth embodiment, weight function $\alpha(d)$ that has a singular reduction is used with weighting based on distance d between the structural elements. In other words, to the extent that the structural elements are at a far distance from the structural elements that are the target of the generation of the fundamental vectors, weighting is provided so that the values of the element vectors become small. Furthermore, $0 < \alpha(d) \leq 1$. For example, in relation to element vector $M_1$ of the "title", weighting is $\alpha(4)$.

Upon the completion of the processing to the element vectors, content vector generation section 45 determines whether or not all the structural elements in the document have been read (step S87). With the document illustrated in FIG. 12, since "paragraph P11" exists following "title", the program returns to step S81, and "paragraph P11" is read-in.

Upon determining whether or not the structural element is the target of the generation of fundamental vectors (step S82), "paragraph P11" is not a target of the generation of the fundamental vector. Next, when a determination is made whether or not the structural element is a paragraph or a heading (step S83), "paragraph P11" is a paragraph.

Therefore, key words are extracted from "paragraph P11", and element vector $M_2$ is generated. Next, when measuring the distance between "paragraph P18" that was the target of the generation of fundamental vector and "paragraph P11" that generated the element vector following the tree structure illustrated in FIG. 13 (step S85), the distance between the structural elements is 4. Upon calculating the distance between the structural elements, weighting is provided relative to element vector $M_2$ of "paragraph P11" (step S86). The weight $\alpha(4)$ is provided relative to element vector $M_2$ of "paragraph P11".

Upon completion of the weighting to the element vectors, content vector generation section 45 makes a determination whether or not all of the structural elements in the document have been read-in (step S87). Since "chapter" exists following "paragraph P11" in the document illustrated in FIG. 12, the program returns to step S81 and "chapter" is read-in.

When all of the structural elements of the document are read-in, and these structural elements are not the targets of the generation of fundamental vectors, and moreover, in the case where they are either paragraphs or headings, element vectors are generated, and weighting is provided by weighting function $\alpha(d)$ based on the distance d from "paragraph P18" that is the target of the generation of the fundamental vector. In other words, concerning the structural element of "chapter" and "section" among the logical structure of the document shown in FIG. 13, element vectors are not generated. Also, element vectors are not generated relating to "paragraph P18" that is the target of the generation of the fundamental vector.

When compiling the processing up to this point, a total of 17 element vectors ($M_1$–$M_{17}$) are generated from "title", "heading" of chapter 1, "headings" of chapter 1 section 1 and chapter 1 section 2, "heading" of chapter 2, "headings" of chapter 2 section 1 - chapter 2 section 4, "paragraph P11"-"paragraph P17", and "paragraph P19", relative to the structural element "paragraph P18" of classification units that was the target of the generation of fundamental vector, and each element vector is weighted by function $\alpha(d)$ corresponding to distance d from "paragraph P18".

When all of the structural elements are read-in, all of the element vectors generated up to this point are synthesized, and a content vector is generated (step S88). In relation to the paragraph to be made the target of the generation of fundamental vector, content vector M is shown by means of equation (21).

$$M = \sum_{i=1}^{n} a(d_i) M_i \qquad (21)$$

In this example, n shows the number of structural elements that were the target of the generation of element vectors, and $d_i$ shows the distance between structural element to be made the target of the generation of fundamental vector and structural element that was to be made the target of the generation of element vector $M_i$.

In the case that "paragraph P18 is to be made the target of the generation of the fundamental vector, content vector $M_{P18}$ is shown by equation (22)

$$M_{P18} = \sum_{i=1}^{17} a(d_i) M_i \qquad (22)$$

In this example, $d_i$ shows the distance between "paragraph P18" and the structural element that was to be made the target of the generation of element vector $M_i$. When continuing the flowchart of the document retrieval of FIG. 2, content vectors and fundamental vectors that were generated up to the present are synthesized by means of the vector synthesis section 46 (step S6 of FIG. 2).

In other words, composite vector $U_{P18}$ relative to "paragraph P18" is shown by equation (23).

$$U_{P18} = L_{P18} + M_{P18} \qquad (23)$$

In this manner, when composite vectors relative to the structural elements of the classification units are generated, composite vector maintenance section 7 attaches the corresponding composite vectors to the structural elements of the classification units and maintains the attached objects (step S7 of FIG. 2).

If documents that should be the target of classification still remain in the document storing section 1, processing such as above is performed once again (program diverts from step S8 of FIG. 2 and proceeds to step S2), and in this example the explanation continues where only document illustrated in FIG. 12 is the target.

When the generation and maintenance of the composite vectors relative to the structural elements of the classification units of all of the documents is completed, classification section 8 reads in all of the composite vectors that were maintained at composite vector maintenance section 7 (step S9 of FIG. 2).

Also, classification section 8 classifies all of the documents into one or more categories by each classification unit based on the degree of similarity of the read-in composite vectors, and maintains the classification results in the classification results maintenance section 9 (step S12 of FIG. 3). By means of the present embodiment, the method based on the cosine coefficient, or in other words equation (16) is used as a calculation method of the degree of similarity between vectors. Also, k-means clustering is used as the method of classification.

An experiment was performed where the standard set illustrated in FIG. 14 and the results that classified the documents with the fifth embodiment were compared. Furthermore, k-means clustering was used as explained with the second embodiment as the method of classification that was performed in step S11 of FIG. 3.

Weight function $\alpha(d)=1/d$, and when the solution ratio S of the fifth embodiment is calculated based on equation (17), it became 61.2%. In the case that step S5 and step S6 of FIG. 2 are abbreviated relative to this, or in other words, in the case that only fundamental vectors are made to be maintained at composite vector maintenance section 7, the solution ratio S of the classification results becomes 55.6%. Thus, the solution ratio improves by 5.6% when the classification is performed due to the synthesis of the content vectors and the fundamental vectors.

Furthermore, although the weight function $\alpha(d)=1/d$ when weighting is provided at the element vectors by this experiment, in the case where $\alpha(d)=1/(nd)$, the solution ratio S becomes 67.0%. Here, n shows the number of all of the structural elements in the document.

In this manner, by dividing $\alpha(d)=1/d$ by the number of all of the structural elements in the document, influences due to the difference in the total number of structural elements of each document can be eliminated, and more accurate classification becomes possible.

Also, when weighting is provided at the element vectors, the degree of similarity between the element vectors and the fundamental vectors generated previously is calculated, and it is acceptable to make the weighting heavier of the element vectors that have a high degree of similarity. The calculation of the degree of similarity of the vectors can, for example, use the equation shown in equation (16), and when the weight is provided with weight function $\alpha(d)=1/d$ multiplied by the degree of similarity shown in equation (16), the solution ratio S became 72.8%.

In this manner, it is possible to further increase the accuracy of the classification due to the addition of the degree of similarity of the element vectors and the fundamental vectors as weighting.

Figure 28:
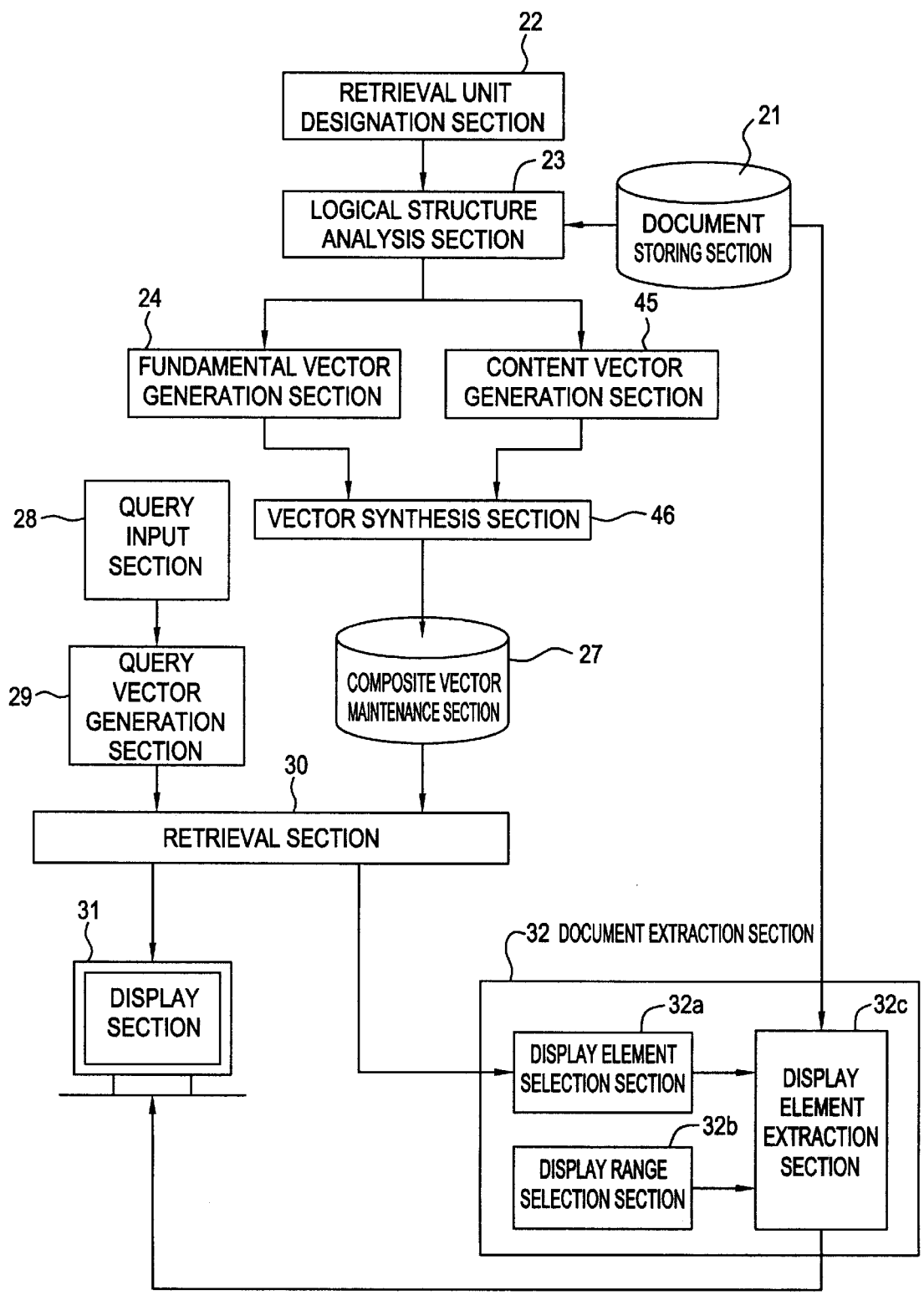
FIG. 28 illustrates the fundamental construction of the sixth embodiment of a document retrieval device of the present invention.
Figure 29:
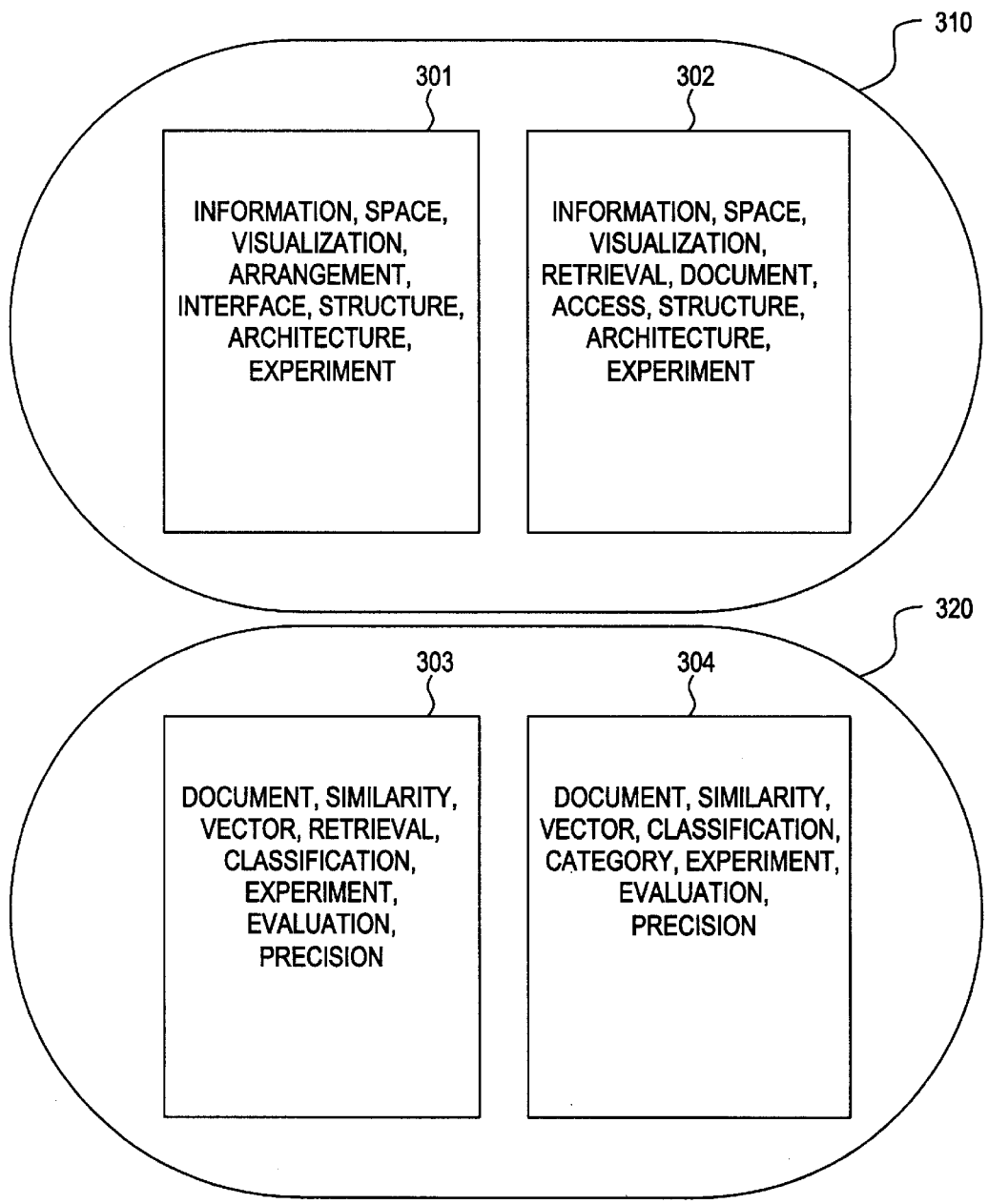
FIG. 29 illustrates an example of the result of document classification.
Figure 30:
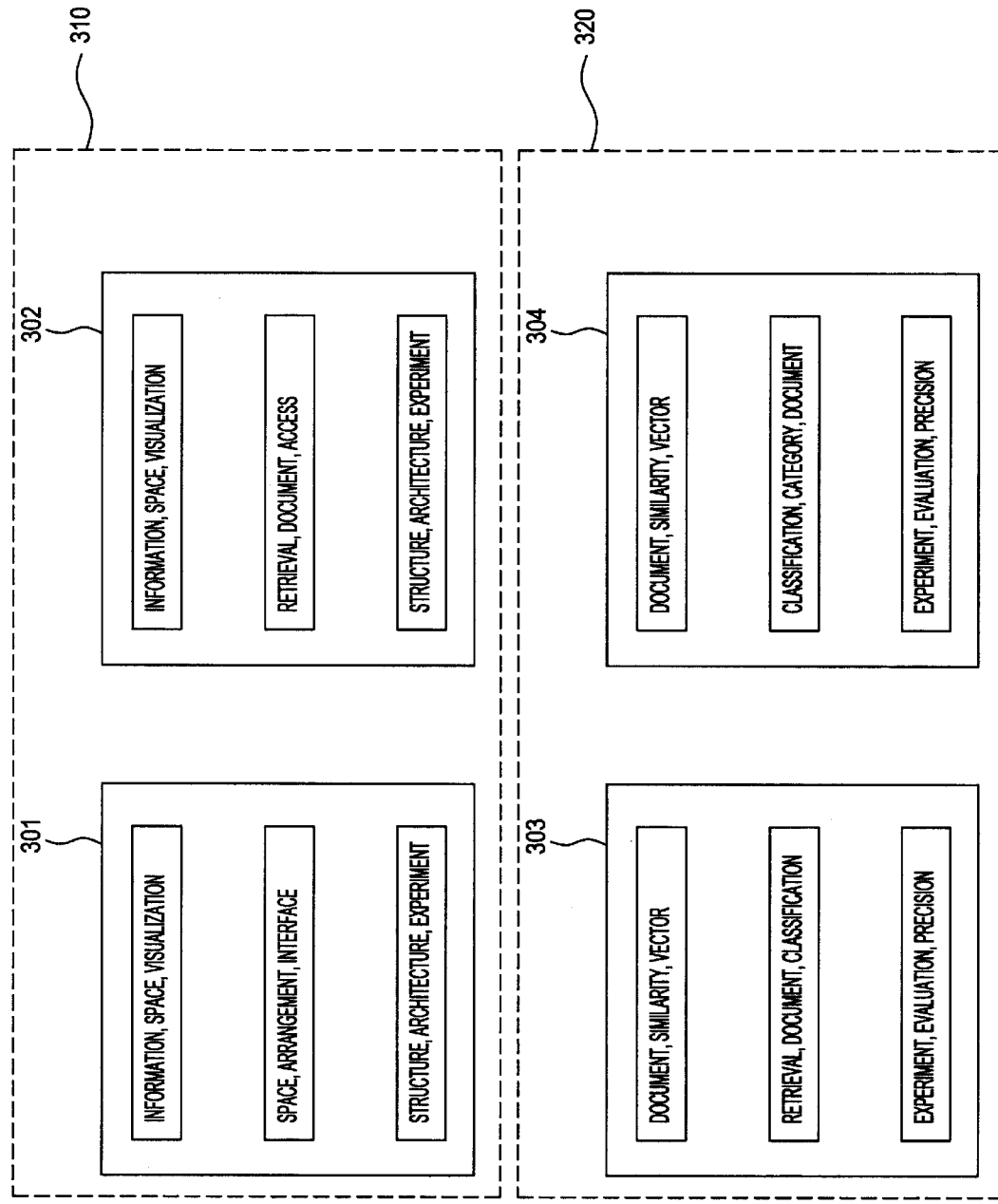
FIG. 30 illustrates each document illustrated in FIG. 29 along with those paragraph structures.

FIG. 28 illustrates the fundamental construction of the sixth embodiment of a document retrieval device of the present invention. The construction of the sixth embodiment of a document retrieval device of the present invention, is the combination of the structures of the fourth embodiment and the structures of the third embodiment together. Consequently, the same symbols are attached to the same components, and the following detailed explanation about the structure of the sixth embodiment is abbreviated.

The sixth embodiment of a document retrieval device comprises document storing section 21, retrieval unit designation section 22, logical structure analysis section 23, fundamental vector generation section 24, content vector generation section 45, vector synthesis section 46, composite vector maintenance section 27, query input section 28, query vector generation section 29, retrieval section 30, display section 31, and document extraction section 32. In this embodiment, content vector generation section 45 and vector synthesis section 46 are the same components as the components of the fourth embodiment, and other than that, the components of the third embodiment.

When document retrieval is performed with a document retrieval device of this sixth embodiment, first, preparation is performed with the order of the flowchart in FIG. 16, and in place of the heading vector generation of step S35 of FIG. 16, content vector generation is performed as explained with the previous FIGS. 23–24 by means of the sixth embodiment.

In other words, the designation of the retrieval units is first performed by means of retrieval unit designation section 22 (step S31 of FIG. 16). Next, logical structure analysis section 23 reads in one of the documents that comprises a target of retrieval from the document storing section 21 (step S32 of FIG. 16), and the logical structure of the read-in document is analyzed (step S33 of FIG. 16). Fundamental vector generation section 24 generates fundamental vectors for each structural element of the retrieval units of logical structure as analyzed with logical structure analysis section 23 (step S34). By this means, content vector generation section 45 generates content vectors in the order explained in FIGS. 23–24. Also, the vector synthesis section 46 synthesizes fundamental vectors and content vectors and generates composite vectors (step S36 of FIG. 16).

Composite vector maintenance section 27 attaches the corresponding composite vectors to the structural elements of the retrieval units from which the fundamental vectors were generated, and maintains the attached objects (step S37). Next, a determination is made whether or not documents remain in document storing section 21 that were yet to be processed by steps S32–S37 (step S38). Also, if documents remain, the process proceeds once again to step S32. If no documents remain, the processing of this flowchart is completed. The fact that the determination is made that no documents remain in the determination of step S38 means that all vectors were generated in relation to all of the documents that are the target of retrieval.

After the document retrieval preparation discussed above is completed, document retrieval is actually performed, and this document retrieval is performed in the order of the flowchart illustrated in FIG. 17.

In other words, a query is first input by means of query input section 28 (step S41 of FIG. 17). Query vector generation section 29 extracts key words directly if the query that was input comprises a key word list, and extracts key words from the content if it is a natural language text, and the query vector is generated (step S42 of FIG. 17).

When the query vector is generated, retrieval section 30 reads in the query vector from query vector generation section and reads in all of the composite vectors relating to the structural elements of the retrieval units from the composite vector maintenance section 27 (step S43 of FIG. 17). Also, the comparison of the query vector and the composite vectors is performed (step S44 of FIG. 17) and is displayed on display section 31 along with the structural elements of the corresponding retrieval units in descending order of the degree of similarity between the composite vectors and the query vector (step S45 of FIG. 17).

The document retrieval itself is tentatively completed by the processing up to this point, but a determination is made whether or not the extraction display of the documents that were retrieved is performed based on the results of the document retrieval by this means (step S46 of FIG. 17). In the case where the extraction display is performed, structural elements are selected that become the target of the extraction display by display element selection section 32a (step S47 of FIG. 17), and the range of the extraction display is selected by display range selection section 32b (step S48 of FIG. 17). Also, elements of the display range are extracted from the document storing section 21 by display element extraction section 32c (step S49 of FIG. 17), and displayed on display section 31 (step S50 of FIG. 17).

In the case where the extraction display is not performed at this point in time, the results of document retrieval are displayed on display section 31. Also, in the case where extraction display is performed, the extracted element is displayed on display section 31. In any case, a determination is made whether or not it is acceptable to complete this document retrieval processing from the display of display section 31 (step S51 of FIG. 17). In the case where the process is not completed, the process continues processing from step S46 once again, and it becomes possible to perform a extraction display relative to different structural elements.

In this manner, the stored documents are partitioned by arbitrary retrieval units by the sixth embodiment of a document retrieval device of the present invention, and at this time, the degree of similarity between the composite vectors that are generated according to key words in the contents of the structural elements that are positioned in the upper level of the structural elements of each retrieval unit and key words in the structural elements of the retrieval units, and the query vector that was generated according to the key words in the query are calculated, and displayed the results in descending order of the degree of similarity. After this, it becomes possible to simply extract only the necessary topics from large volume documents and huge documents because detailed content can be displayed as needed.

Furthermore, by means of the present embodiment, the element vectors of "headings" and the element vectors of "paragraphs" are made to be equally weighted when content vectors are synthesized, and it is acceptable to change the weighting to the element vectors of the "headings" and the weighting to the element vectors of "paragraphs" due to the state of the documents and the purpose of retrieval. For example, if the weighting to the element vectors of the "headings" is made to weight more than the weighting to the element vectors of "paragraphs", document retrieval becomes possible that attaches more importance to the content of "headings" than the content of "paragraphs".

Also, when element vectors relative to "headings" or "paragraphs" are generated, the degree of similarity with the fundamental vectors that were generated beforehand is calculated, and it is acceptable to add more weight to the element vectors that hold a high degree of similarity with the fundamental vectors. For example, as known in the prior art, cosine coefficients are used, and the degree of similarity sim (P,Q) (0<sim(P,Q)<1) of t dimension vectors $P=(p_1, \ldots, p_t)$ and $Q=(q_1, \ldots, q_t)$ is calculated with equation (20), and if this degree of similarity sim (P,Q) is used with weighting, the classification is performed with more emphasis on the contents of the structural elements of the retrieval units. By this means, it becomes possible to increase the accuracy of the document retrieval.

By this, the contents of each retrieval unit of a document that is made to be the retrieval object and the content of other retrieval units are shown with the key words by a document retrieval device of the present invention, and the structural elements are retrieved based on the degree of similarity between the composite vectors that were generated from these key words and the query vector that was generated from the query. Therefore, structural elements with a high probability that includes the key words in the query can be detected, with taking into consideration the information of the content of the whole body of the document.

By means of the present invention as explained above, in order to perform the retrieval of the structural elements of the document while the context of the entire document is taken into consideration, a fundamental vector generation means is established that generates fundamental vectors from the key words included in the structural elements that were designated as retrieval units or classification units. Also, a composite vector generation section are established that synthesizes fundamental vectors and heading vectors that are generated from the headings of structural elements that are arranged in higher level than the designated structural elements, or synthesizes fundamental vectors and content vectors that are generated from key words included in the structural elements other than the designated structural elements, and generates composite vectors. Also, a classification system is further established that uses the degree of similarity of these composite vectors and classifies and displays the structural elements of the documents. In other words, a retrieval means is established that compares the query vector that were generated from the query with the composite vectors, and retrieves structural elements of a high degree of similarity.

With this system, it becomes possible to retrieve topics by unit of structural elements with taking into consideration the context of the entire document. Also, by means of providing arbitrary weighting when heading vectors and content vectors and the like are synthesized with fundamental vectors, retrieval can be conducted adaptive to the intention of the retrieval and the nature of the target documents.

What is claimed is:

1. A document retrieval device that classifies a group of documents, each document having structural elements arranged in a logical hierarchical format, each structural element including at least one of a heading and a content, the documents stored in a document storage device, the retrieval device comprising:

logical structure analysis means for analyzing the logical hierarchical format of the documents and for obtaining structural elements and a hierarchical relationship between the structural elements within each document;

classification unit designation means for designating a classification unit showing which level the structural elements to be classified are at within the hierarchical relationship;

fundamental vector generation means for extracting a key word from the content of each structural element of the classification unit that is designated by the classification unit designation means, and for generating a fundamental vector based on the extracted key word;

heading vector generation means for extracting a key word from the heading of each structural element that is superordinate to the structural element used to generate the fundamental vector within said hierarchical relationship, and for generating a heading vector based on the extracted key word;

vector synthesis means for generating, for each structural element of the classification unit, a composite vector based on the corresponding fundamental and heading vectors; and classification means for calculating a degree of similarity among the composite vectors and for classifying the structural elements of the documents based on the degree of similarity.

2. The document retrieval device of claim 1, further comprising;

classification result maintenance means for maintaining the classification results; and reclassification designation means for reclassifying the structural elements based on the results maintained in the classification result maintenance means.

3. The document retrieval device of claim 1, further comprising:

a display element selection section that selects the structural element of the classification unit from the result of the classifications generated by the classification means;

a display range selection section that allows selection of a range of structural element to be displayed from the structural elements that include the classification unit; and a display element extraction section that extracts from the document storage device the structural element selected by the display element selection section, and that displays the range of the structural element selected with said display range selection section.

4. A document retrieval device that retrieves structural elements of documents, each document having structural elements arranged in a logical hierarchical format, each structural element including at least one of a heading and a content, the documents stored in a document storage device, the retrieval device comprising:

logical structure analysis means for analyzing the logical hierarchical format of said documents and for obtaining structural elements and a hierarchical relationship between the structural elements within each document;

retrieval unit designation means for designating a retrieval unit, the retrieval unit showing which level the structural elements to be retrieved are at within the hierarchical relationship;

fundamental vector generation means for extracting a key word from the content of each structural element of the retrieval unit designated by the retrieval unit designation means, and for generating a fundamental vector based on the extracted key word;

heading vector generation means for extracting a key word from the heading of each structural element that is superordinate to the structural element used to generate the fundamental vector within said hierarchical relationship, and for generating a heading vector based on the extracted key word;

vector synthesis means for generating, for each structural element of the retrieval unit, a composite vector based on the corresponding fundamental and heading vectors;

query input means for inputting a query;

query vector generation means for generating a query vector from the query; and retrieval means for calculating a degree of similarity between the query vector and each composite vector and for retrieving the structural elements of the retrieval unit having a predetermined degree of similarity relative to composite vectors.

5. The document retrieval device of claim 4, wherein the query is a key word list or a natural language text.

6. The document retrieval device of claim 4, further comprising:

a display element selection section that selects a structural element to be displayed from the structural elements retrieved by the retrieval means;

a display range selection section that allows selection of a range of the structural element to be displayed from the structural elements that include the retrieval unit; and a display element extraction section that extracts from the document storage device the structural element selected by said display range selection section and that displays the structural element on a display means.

7. A document retrieval device that classifies a group of documents, each document having structural elements arranged in a logical hierarchical format, each structural element having a content, the documents stored in a document storage device, the retrieval device comprising:

logical structure analysis means for analyzing the logical hierarchical format of the documents and for obtaining structural elements and a hierarchical relationship between the structural elements within each document;

classification unit designation means for designating a classification unit showing which level the structural elements to be classified are at within the hierarchical relationship;

fundamental vector generation means for extracting a key word from the content of each structural element of the classification unit that is designated by the classification unit designation means, and for generating a fundamental vector based on the extracted key word;

content vector generation means for extracting a key word from the content of each structural element other than the structural element used to generate the fundamental vector, and for generating a content vector for each structural element based on the extracted key word;

vector synthesis means for generating, for each structural element of the classification unit, a composite vector based on the corresponding fundamental and content vectors; and classification means for calculating a degree of similarity among the composite vectors and for classifying the structural elements of the documents based on the degree of similarity.

8. The document retrieval device of claim 7, wherein the content vector generation means provides weights to the content vector based on whether the structural element includes headings.

9. The document retrieval device of claim 7, wherein:

the content vector generation means generates an element vector relative to each structural element other than the structural element used to generate the fundamental vector, calculates the degree of similarity between each element vector and each fundamental vector, and wherein the content vectors are generated based on the generation and weight provided at the element vectors according to the degree of similarity.

10. The document retrieval device of claim 7, further comprising:

classification result maintenance means for maintaining the classification results; and reclassification designation means for reclassifying the structural elements based on the results maintained in said classification result maintenance means.

11. The document retrieval device of claim 7, further comprising:

a display element selection section that selects the structural element of the classification unit from the result of the classification;

a display range selection section that allows selection of a range of the structural element to be displayed from the structural elements of the hierarchical structure; and a display element extraction section that extracts from the document storage device the structural element selected by the display element selection section and that displays the range of the structural element on a display means.

12. The document retrieval device of claim 11, wherein said content vector generation means provides weights to the content vector based on whether the structural element includes headings.

13. A document retrieval device that classifies a group of documents, each document having structural elements arranged in a logical hierarchical format, each structural element having a content, the documents stored in a document storage device, the retrieval device comprising:

logical structure analysis means for analyzing the logical hierarchical format of the documents and for obtaining structural elements and a hierarchical relationship between the structural elements within each document;

retrieval unit designation means for designating a retrieval unit, the retrieval unit showing which level the structural elements to be retrieved are at within the hierarchical relationship;

fundamental vector generation means for extracting a key word from the content of each structural element of the retrieval unit designated by the retrieval unit designation means, and for generating a fundamental vector based on the extracted key word;

content vector generation means for extracting a key word from the content of each structural element other than the structural element used to generate the fundamental vector, and for generating a content vector for each structural element based on the extracted key word;

vector synthesis means for generating, for each structural element of the retrieval unit, a composite vector based on the corresponding fundamental and content vectors;

query input means for inputting a query;

query vector generation means for generating a query vector from the query; and retrieval means for calculating a degree of similarity between the query vector and each composite vector and for retrieving the structural elements of the retrieval unit having a predetermined degree of similarity relative to composite vectors.

14. The document retrieval device of claim 13, wherein the query is a key word list or a natural language text.

15. The document retrieval device of claim 13, wherein the vector synthesis means provides weights to the content vectors according to the degree of similarity between the fundamental vectors and the content vectors.

16. The document retrieval device of claim 13, further comprising:

a display element selection section that selects the structural element to be displayed from the results of the retrieval;

a display range selection section that allows selection of a range of the structural element to be displayed from the retrieved upper structural elements of the hierarchical structure; and a display element extraction section that extracts from the document storage device the structural element that were selected by the display range selection section and that displays the structural elements on a display means.

* * * * *